United States Patent [19]
Miller et al.

[11] Patent Number: 5,168,547
[45] Date of Patent: Dec. 1, 1992

[54] DISTRIBUTED ARCHITECTURE FOR INPUT/OUTPUT FOR A MULTIPROCESSOR SYSTEM

[75] Inventors: Edward C. Miller, Eau Claire; Steve S. Chen, Chippewa Falls; Frederick J. Simmons, Neillsville; George A. Spix, Eau Claire; Leonard S. Veil, Eau Claire; Mark J. Vogel, Eau Claire; John M. Wastlick, Eau Claire, all of Wis.

[73] Assignee: Supercomputer Systems Limited Partnership, Eau Claire, Wis.

[21] Appl. No.: 536,182

[22] Filed: Jun. 11, 1990

Related U.S. Application Data

[63] Continuation-in-part of Ser. No. 459,083, Dec. 29, 1989.

[51] Int. Cl.⁵ .............................................. G06F 15/16
[52] U.S. Cl. ................................. 395/325; 364/225.5; 364/229.0; 364/931.4
[58] Field of Search ... 364/200 MS File, 900 MS File, 364/DIG. 1, DIG. 2; 395/325

[56] References Cited

U.S. PATENT DOCUMENTS

| | | | |
|---|---|---|---|
| 3,618,045 | 11/1971 | Campbell | 364/200 |
| 3,772,656 | 11/1973 | Serracchioli | 364/200 |
| 3,889,237 | 6/1975 | Alferness | 364/200 |
| 3,996,564 | 12/1976 | Kerrigan | 364/200 |
| 4,124,889 | 11/1978 | Kaufman | 364/200 |
| 4,271,479 | 6/1981 | Cheselka | 364/900 |

*Primary Examiner*—David Y. Eng
*Attorney, Agent, or Firm*—Patterson & Keough

[57] ABSTRACT

A distributed architecture for the input/output system for a multiprocessor system provides for equal and democratic access to all shared hardware resources by both the processors and the external interface ports of the multiprocessor system. This allows one or more input/output concentrators attached to the external interface ports to have complete access to all of the shared hardware resources across the multiprocessor system without requiring processor intervention. The distributed input/output system provides for communication of data and control information between a set of common shared hardware resources and a set of external data sources. The result is a highly parallel multiprocessor system that has multiple parallel high performance input/output ports capable of operating in a distributed fashion. The distributed architecture also permits both processors and external interface ports to access all of the shared data structures associated with the operating system that contain the input/output control information.

9 Claims, 22 Drawing Sheets

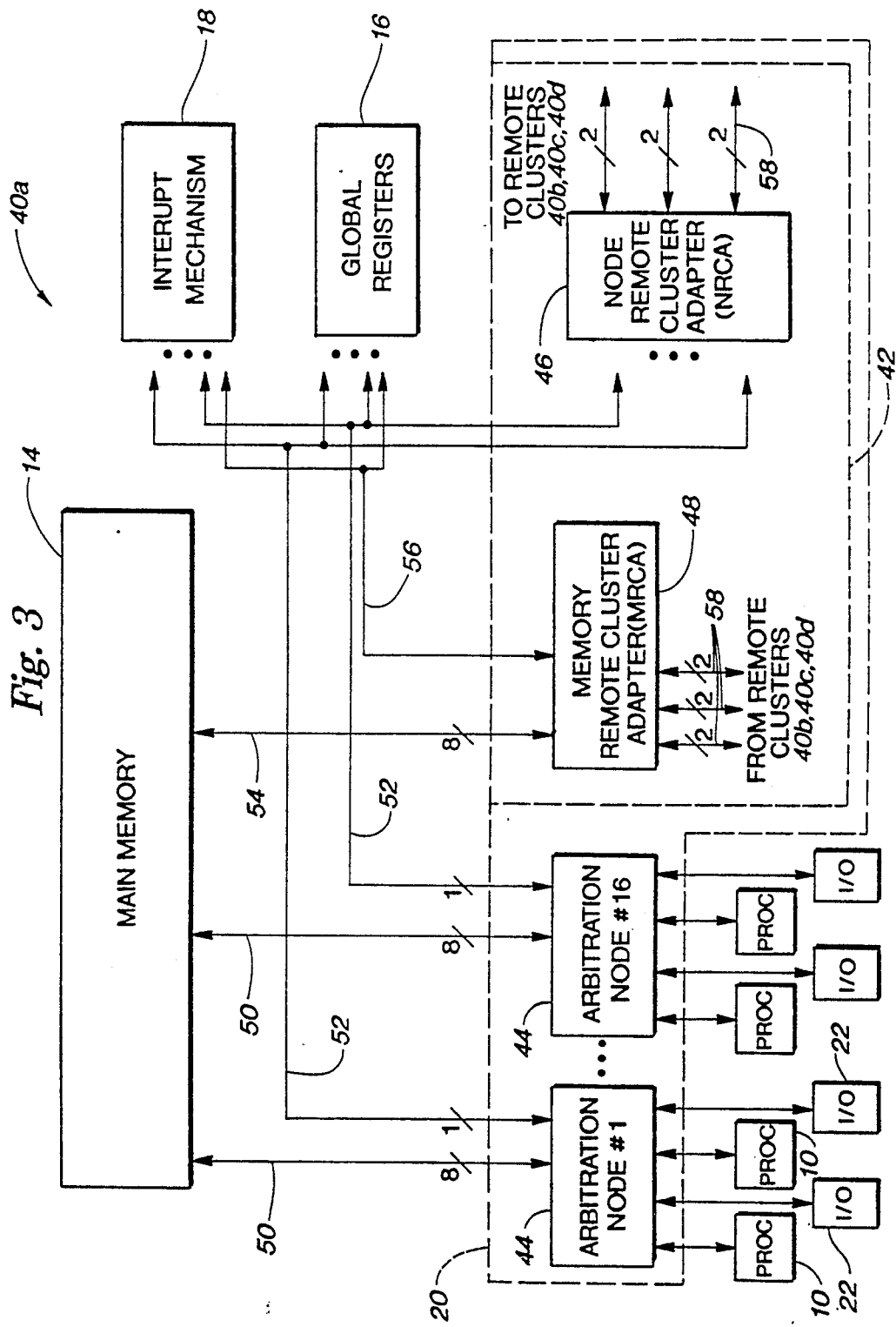

Fig. 5c

```
TYPE CODE   OPERATION
000000      NOP
000001      MEMORY STORE
000010      MEMORY FETCH
000011      LOADF
000101      SIGNAL (INTERRUPT)
000111      READ FROM GLOBAL REGISTER
001000      STORE DATA FIELD TO GLOBAL REGISTER
001001      SET BITS IN GLOBAL REGISTER THAT ARE SET IN DATA FIELD
001010      ADD DATA TO CONTENTS OF GLOBAL REGISTER AND RETURN DATA
            FROM GLOBAL REGISTER PRIOR TO MODIFICATION
001011      REPLACE CONTENTS OF GLOBAL REGISTER AND RETURN DATA FROM
            GLOBAL REGISTER PRIOR TO MODIFICATION
001100      CLEAR BITS IN GLOBAL REGISTER THAT ARE SET IN DATA FIELD
001101      ADD DATA FIELD TO CONTENTS OF GLOBAL REGISTER
001110      SET BITS IN GLOBAL REGISTER THAT ARE SET IN DATA, RETURN
            REGISTER CONTENTS PRIOR TO MODIFICATION
001111      ADD DATA FIELD TO CONTENTS OF GLOBAL REGISTER, RETURN
            DATA TO MODIFICATION. IF RESULT OF ADD IS LESS
            THAN ZERO, DO NOT UPDATE GLOBAL REGISTER
010001      SMS BLOCK STORE
010010      SMS BLOCK FETCH
100001      MEMORY STORE WITH MARK
101000      STORE DATA FIELD TO GLOBAL REGISTER WITH MARK
101001      SET BITS IN GLOBAL REGISTER THAT ARE SET IN DATA FIELD
            WITH MARK
101100      CLEAR BITS IN GLOBAL REGISTER THAT ARE SET IN DATA FIELD
            WITH MARK
101101      ADD DATA FIELD TO CONTENTS OF GLOBAL REGISTER WITH MARK
110001      SMS BLOCK WRITE WITH MARK
```

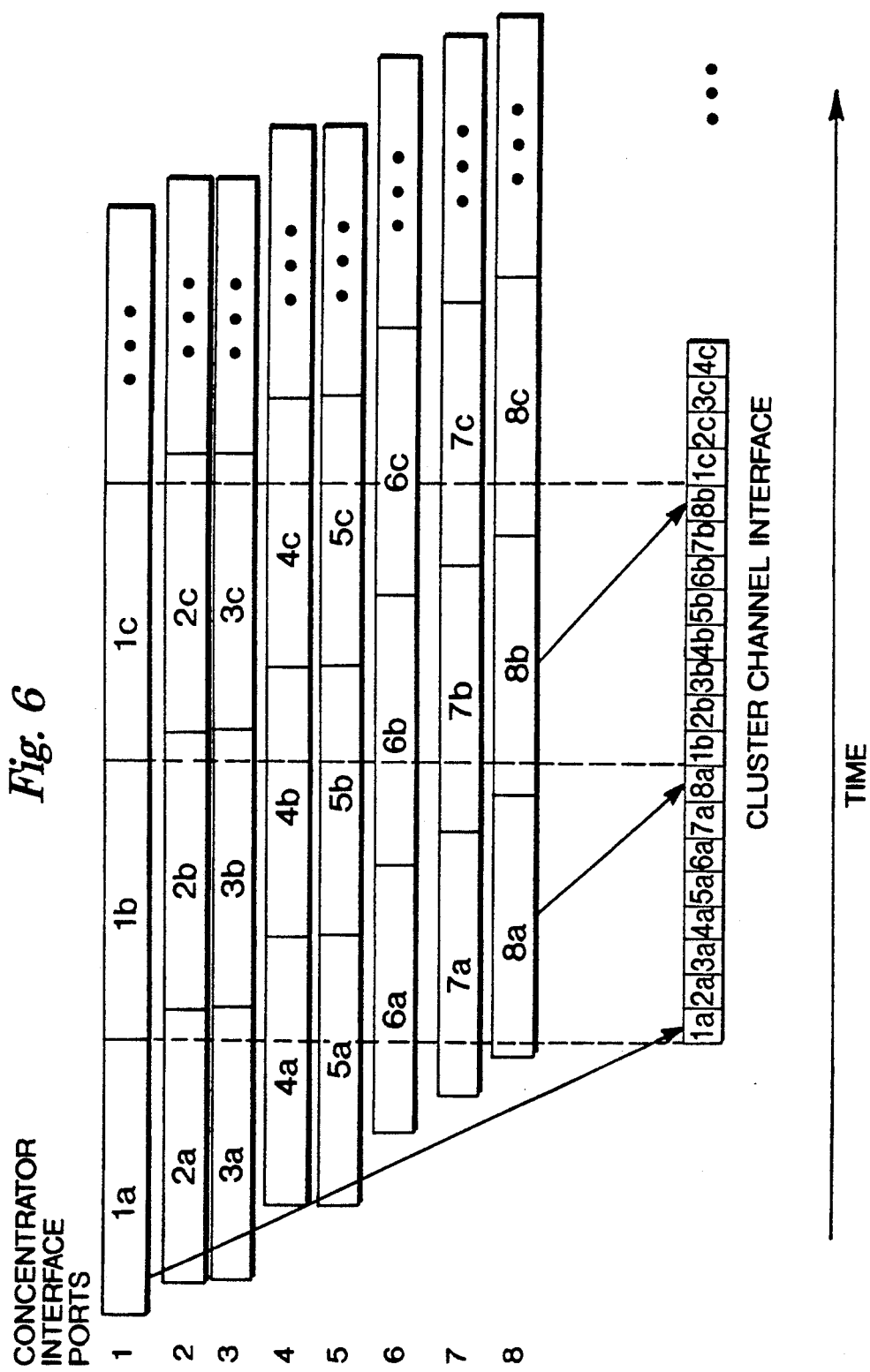

Fig. 7c

| COMMAND FIELD (3:0) | OPERATION |
|---|---|
| 0 | NOP |
| 1 | WRITE DATA BLOCK |
| 2 | READ DATA BLOCK |
| 3 | NOP |
| 4 | READ STATUS WORDS |
| 5 | READ ERROR REGISTERS N |
| 6 | READ ERROR REGISTERS N-1 |
| 7 | NOP |
| 8 | NOP |
| 9 | NOP |
| A | NOP |
| B | NOP |
| C | WRITE STATUS WORDS |
| D | WRITE ERROR REGISTERS N |
| E | WRITE ERROR REGISTERS N-1 |
| F | RESET |

Fig. 11

| BIT 3 2 1 0 | DESTINATION |
|---|---|
| 0 X X X | SOCKET INTERFACE MEANS BUFFER (WHERE XXX = BINARY CODE FOR SOCKET INTERFACE MEANS 1 - 8 |
| 1 0 X X | MM TO SM BUFFER (WHERE XX = ONE OF THREE, 64-WORD SEGMENTS) |
| 1 0 1 1 | SMTC 0 OR 1 COMMAND BLOCK FETCH |
| 1 1 X X | SM TO MM BUFFER (WHERE XX = ONE OF THREE, 64-WORD SEGMENTS) |

| VALID<br>1 BIT | CLASS<br>1 BIT | CHANNEL<br>3 BITS | TYPE<br>2 BITS |
|---|---|---|---|

$2^{63}$ ... $2^0$

| TRANSFER STATUS | WORD 0 |
| SMTC COMMAND | WORD 1 |
| SMS FBA | WORD 2 |
| SMS NBLOCKS | WORD 3 |
| SMS BLKINCR | WORD 4 |
| MM FWA | WORD 5 |
| SIGNAL DEVICE SELECTION | WORD 6 |

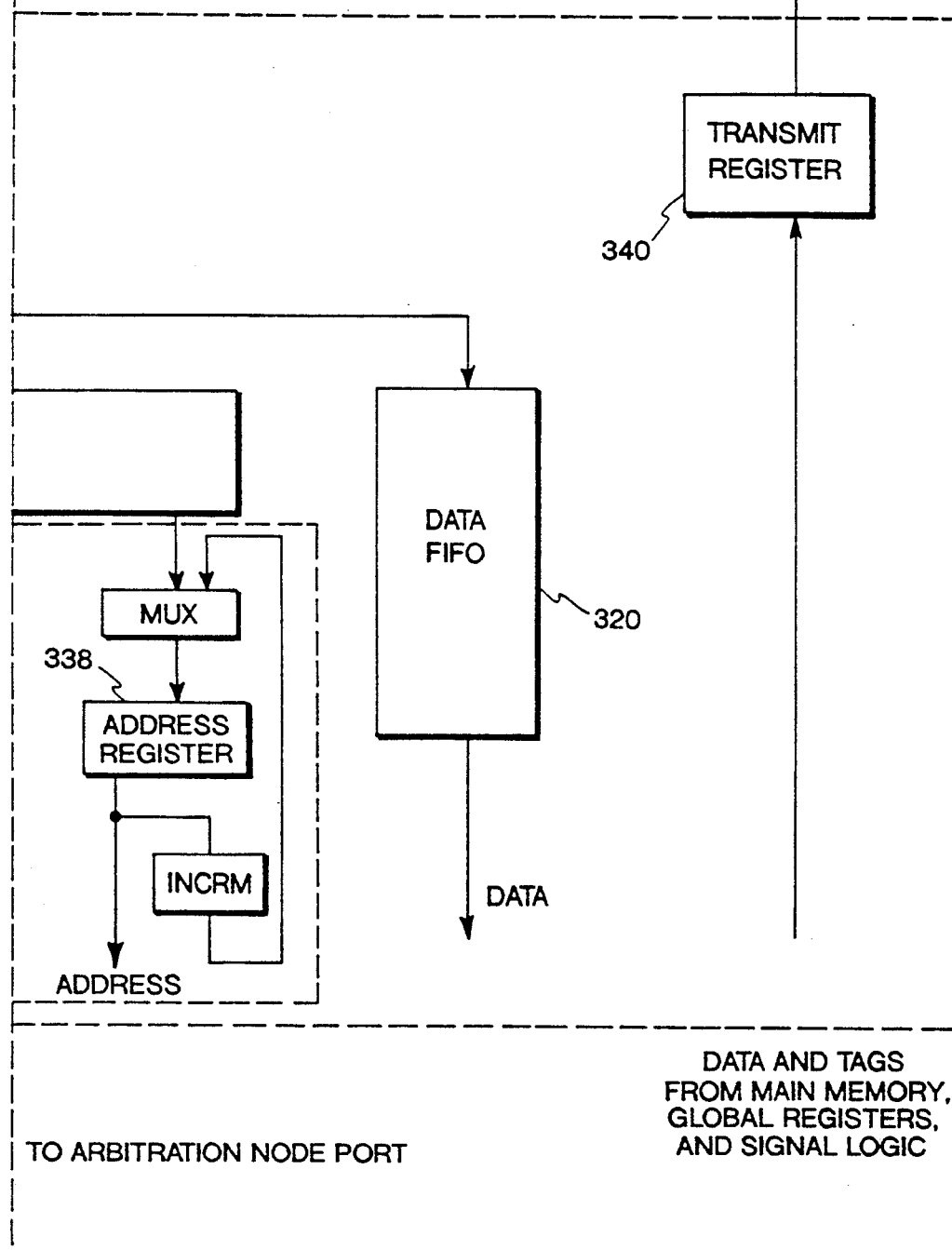

Fig. 16a

| CODE | COMMAND |
|---|---|
| 0000 | NOP |
| 0001 | STORE DATA BLOCK TO SMS |
| 0010 | NOP |
| 0011 | NOP |
| 0100 | NOP |
| 0101 | NOP |
| 0110 | NOP |
| 0111 | NOP |
| 1000 | NOP |
| 1001 | NOP |
| 1010 | NOP |
| 1010 | NOP |
| 1011 | NOP |
| 1100 | NOP |
| 1101 | STORE ERROR REGISTERS |
| 1110 | NOP |
| 1111 | RESET CHANNEL |

Fig. 18

| BIT | | | |
|---|---|---|---|
| 5 (ENABLE) | 6 (INVERT) | 8-7 (SELECT) | PERCENTAGE OF TOTAL MEMORY CYCLES ALLOCATED TO THE SMTC |
| 0 | X | XX | AT LEAST 11% |
| 1 | 0 | 00 | 100% |
| 1 | 0 | 01 | AT LEAST 50% |
| 1 | 0 | 10 | AT LEAST 33% |
| 1 | 0 | 11 | AT LEAST 25% |
| 1 | 1 | 00 | 0% |
| 1 | 1 | 01 | AT LEAST 50% |
| 1 | 1 | 10 | AT LEAST 66% |
| 1 | 1 | 11 | AT LEAST 75% |

Fig. 16b

| CODE | COMMAND |
|---|---|
| 0000 | NOP |
| 0001 | NOP |
| 0010 | FETCH DATA BLOCK FROM SMS |
| 0011 | NOP |
| 0100 | NOP |
| 0101 | FETCH ERROR REGISTERS |
| 0110 | NOP |
| 0111 | NOP |
| 1000 | NOP |
| 1001 | NOP |
| 1010 | NOP |
| 1010 | NOP |
| 1011 | NOP |
| 1100 | NOP |
| 1101 | NOP |
| 1110 | NOP |
| 1111 | RESET CHANNEL |

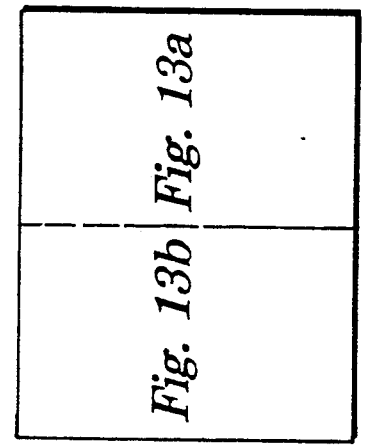
Fig. 2
| Fig. 2a | Fig. 2b |
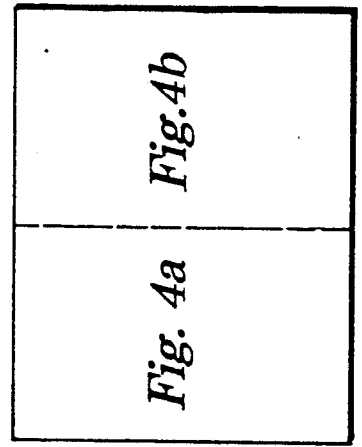
Fig. 4
| Fig. 4a | Fig. 4b |
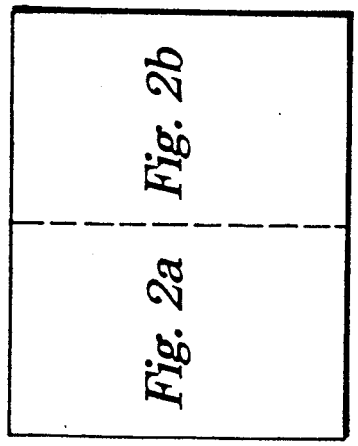
Fig. 13
| Fig. 13a | Fig. 13b |
Fig. 19
| COMMAND BLOCK WORD | TAG (BINARY) | FUNCTION |
|---|---|---|
| 1 | 1X11000000 | TRANSFER STATUS |
| 2 | 1X11000001 | SMTC COMMAND |
| 3 | 1X11000010 | SM FIRST BLOCK ADDRESS |
| 4 | 1X11000011 | BLOCK COUNT |
| 5 | 1X11000100 | SM BLOCK ADDRESS INCREMENT |
| 6 | 1X11000101 | MAIN MEMORY FIRST WORD ADDRESS |
| 7 | 1X11000110 | SIGNAL DEVICE SELECT |
WHERE X = 0 FOR SMTC0 AND X = 1 FOR SMTC1 IN THE TAG FIELD.

DISTRIBUTED ARCHITECTURE FOR INPUT/OUTPUT FOR A MULTIPROCESSOR SYSTEM

RELATED APPLICATIONS

This application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, and assigned to the assignee of the present invention, a copy of which is attached and hereby incorporated in the present application.

This application is also related to co-pending applications filed in the United States Patent and Trademark Office concurrently herewith, entitled, SCALAR/VECTOR PROCESSOR, Ser. No. 07/536,409, SOFTWARE ARCHITECTURE FOR A HIGHLY PARALLEL MULTIPROCESSOR SYSTEM, Ser. No. 07/537,466, and METHOD AND APPARATUS FOR NON-SEQUENTIAL RESOURCE ACCESS, Ser. No. 07/535,786, all of which are assigned to the assignee of the present invention, and a copy of each of which is attached and hereby incorporated in the present application. This application is also related to co-pending applications filed in the United States Patent and Trademark Office concurrently herewith, entitled, GLOBAL REGISTERS FOR A MULTIPROCESSOR SYSTEM, Ser. No. 07/536,189, FAST INTERRUPT MECHANISM FOR A MULTIPROCESSOR SYSTEM, Ser. No. 07/536,199, SIGNALING MECHANISM FOR A MULTIPROCESSOR SYSTEM, Ser. No. 07/536,192, METHOD AND APPARATUS FOR A LOAD AND FLAG INSTRUCTION, Ser. No. 07/536,217, and METHOD AND APPARATUS FOR A MULTIPLE REQUEST TOGGLING PRIORITY SYSTEM, Ser. No. 536,417, all of which are assigned to the assignee of the present invention, and a copy of each of which is attached and hereby incorporated in the present application.

TECHNICAL FIELD

This invention relates generally to the field of input/output systems for computer and electronic logic systems. More particularly, the present invention relates to a distributed architecture for input/output for a highly parallel multiprocessor system that allows peripheral device controllers to have complete access to all of the shared hardware and operating system resources across the multiprocessor system without requiring processor intervention.

BACKGROUND ART

One of the problems with many prior art architectures for supercomputers is that regardless of how fast the processors are, the information bandwidth between the input/output devices and the main memory of the supercomputer operates to effectively limit the overall processing speed of the supercomputer. If an application program is input/output intensive, traditional supercomputers can not use their increased processing power on the application program because most prior art supercomputers have only a limited number of memory ports. This limited number of memory ports limits the information bandwidth between the input/output devices and the main memory and, as a result, the processors end up waiting for input/output devices to complete, instead of performing useful computational work.

Another problem with prior art architectures for input/output systems for supercomputers, particularly minimally parallel supercomputers, is that a processor is required to initiate or manage an input/output request. This requirement reduces the ability of the processor to perform work during the time that the processor is initiating or managing the input/output request, particularly when the processor needs to wait for a relatively slow speed input/output device to complete an operation. The requirement that a processor manages an input/output request also means that managing an increased number of input/output devices requires more processor cycles. Instead of increasing the information bandwidth by adding more input/output devices, throughput can actually decrease as more processor cycles are devoted to managing the increased number of input/output devices, thereby reducing the number of cycles available for useful computation. Because the processors in present multiprocessor systems manage input/output requests in such a centralized manner, the effectiveness of the processor speed is reduced significantly.

A further problem is that most prior art architectures for input/output systems for supercomputers use a channel-type architecture for input/output requests. Channel architectures limit the performance and utility of the supercomputer because the input/output system must deal with the network protocol issues associated with the peripheral network connections at the other end of the channel. As a result, more processor cycles are required to manage input/output requests because the procedure for handling these requests is more complicated.

Still another problem with present input/output architectures for supercomputers is that shared hardware resource lockout is generally accomplished by assigning a single, central scheduling processor the task of keeping track of the resources that are currently being used by each processor. This can result in a bottleneck when the central scheduling processor is trying to handle simultaneous resource lockout requests. Because a single processor performs this resource lockout function, competing requests must be stacked and handled in a sequential order. The stacked requests are delayed until the scheduling processor has finished processing the prior requests. By servicing input/output requests sequentially through a single or small number of schedulers, input/output devices are idle while waiting for their turn to be serviced.

Even when an application program is not input/output intensive, the input/output bandwidth can become a performance bottleneck. Simply increasing the processing speed of the processors can saturate an input/output system to the point where processors are idle while waiting for input/output operations to complete. As a result, prior art multiprocessor systems have an inherent input/output bandwidth bottleneck.

In an effort to increase the processing speed and flexibility of supercomputers, the cluster architecture for highly parallel multiprocessors described in the parent application identified above provides an architecture for supercomputers wherein a multiple number of processors and external interfaces can make multiple and simultaneous requests to a common set of shared hardware resources, such as main memory, global registers or interrupt mechanisms. Although this new cluster architecture offers a number of solutions that can increase the parallelism and performance of supercomputers, it is desirable to have an input/output architecture for a highly parallel multiprocessor system that can distribute the responsibility for input/output management throughout the multiprocessor system and also allow the peripheral device controllers to access the shared hardware and operating system resources of such a multiprocessor system.

SUMMARY OF THE INVENTION

The present invention is a distributed architecture for the input/output system of a highly parallel multiprocessor system. The invention provides for equal and democratic access to all shared hardware resources by both the processors and the external interface ports of the multiprocessor system. This allows one or more input/output concentrators attached to the external interface ports to have complete access to all of the shared hardware resources across the multiprocessor system without requiring processor intervention. The result is a highly parallel multiprocessor system that has multiple parallel high performance input/output ports capable of operating in a distributed fashion. The present invention also permits both processors and external interface ports to access all of the Operating System Shared Resources (OSSR), data structures that contain the input/output control information. For the purposes of the present invention, the architecture of the preferred multiprocessor system also supports a distributed interrupt system.

The present invention is an architecture for a distributed input/output system that provides for communication of data and control information between a set of common shared hardware resources and a set of external data sources. Such external data sources may include, for example, secondary memory storage systems, disk drive storage systems, other external processors, communication networks, and conventional input/output devices such as printers, displays and tape systems. The external interface ports of the present invention are connected to one or more input/output concentrators. The input/output concentrators are in turn connected with the peripherals device controllers for the various external data sources.

In the preferred embodiment, the peripheral device controllers can include standard peripheral device controllers for interfacing traditional peripheral devices over standard channels, and one or more secondary memory transfer controllers for interfacing with secondary memory storage systems over high-speed channels. The standard peripheral device controllers connect to the input/output concentrator through a series of concentrator interface ports to a plurality of channel adapters connected to the standard channels. The secondary memory transfer controllers connect to the input/output concentrator through a secondary memory port to the high-speed channel.

The preferred embodiment of the present invention includes both shared hardware and operating system resources. The shared hardware resources include main memory, global registers and interrupt (event) mechanisms. The global registers are the type of common shared semaphore registers that are capable of atomic resource allocation operations. The interrupt (event) mechanism is capable of processing interrupts, exceptions and signals. The Operating System Shared Resources (OSSR) are resources that are used by the operating system in controlling the execution of the multiprocessor system. The OSSRs are data structures that contain the input/output information sufficient to allow the peripheral controller to manage its own access to the hardware shared resources. The OSSRs are scattered throughout the multiprocessor system. The OSSRs do not include operating system routines or protocols.

Unlike the central input/output concentrators of present shared-memory supercomputers or the buffered input/output systems of present memory-hierarchy supercomputers, the distributed external interfaces of the present invention increase the effective transfer bandwidth between the shared resources and the external data sources. Because the responsibility for input/output communication is distributed over a plurality of external interface ports and because the external interface ports are connected to the shared resources through a plurality of arbitration nodes, transfer bottlenecks are reduced. The architecture of the preferred embodiment allows management for any input/output requests to be distributed across a number of processors, thereby removing this type of transfer bottleneck.

With the distributed input/output architecture of the present invention input/output resources may be used to service input/output requests in parallel, thereby increasing bandwidth while decreasing latency. The architecture of the present invention is also extensible in that it is possible to add input/output management resource as more peripheral devices are added. The architecture of the preferred embodiment permits network processors to be implemented using a direct memory interconnect through the input/output concentrator and the channel adapted so that these processors can be treated as true co-processors, that is, additional parallel processor systems contributing to the overall computer processing system function as the architectures of the co-processors best can.

An objective of the present invention is to provide a distributed input/output architecture for a highly parallel multiprocessor system that provides for communication of data and control information between shared resources and external data sources.

Another objective of the present invention is to provide a distributed input/output architecture for a highly parallel multiprocessor system that allows input/output resources to be used in parallel, thereby increasing bandwidth while decreasing latency.

A further objective of the present invention is to provide a distributed input/output architecture for a highly parallel multiprocessor system that is extensible wherein it is possible to add input/output management resource as more peripheral devices are added.

Still another objective of the present invention is to provide a distributed input/output architecture for a highly parallel multiprocessor system that distributes the responsibility for input/output communication over a plurality of external interface ports to reduce this type of input/output transfer bottleneck.

A still further objective of the present invention is to provide a distributed input/output architecture for a highly parallel multiprocessor system that allows any input/output management to be distributed across a number of processors, thereby removing this type of input/output transfer bottleneck.

These and other objectives of the present invention will become apparent with reference to the drawings, the detailed description of the preferred embodiment and the appended claims.

DESCRIPTION OF THE DRAWINGS

FIG. 3 is a block diagram of a single multiprocessor cluster showing the arbitration node means of the preferred embodiment.

FIGS. 5a, 5b and 5c show the format of the CCI packets, the command word format for the CCI commands and the various types of commands for the CCI packet.

FIG. 6 shows a chart of the concentrator interface port transfers over time and the resulting main memory store port transfers for an arbitrary sample transfer.

FIGS. 7a, 7b and 7c show the format of the SMTC packets, the command word format for the SMTC commands and the various types of commands for the SMTC packet.

FIG. 11 shows the request tags and the four-bit buffer select field that is decoded for the request tags.

FIGS. 16a and 16b show the command definitions for the SMTC0 and the SMTC1.

FIG. 18 shows the priority select field for the IOC.

FIG. 19 shows the correspondence between the request tag and the command block word.

DESCRIPTION OF THE PREFERRED EMBODIMENTS

Figure 1:
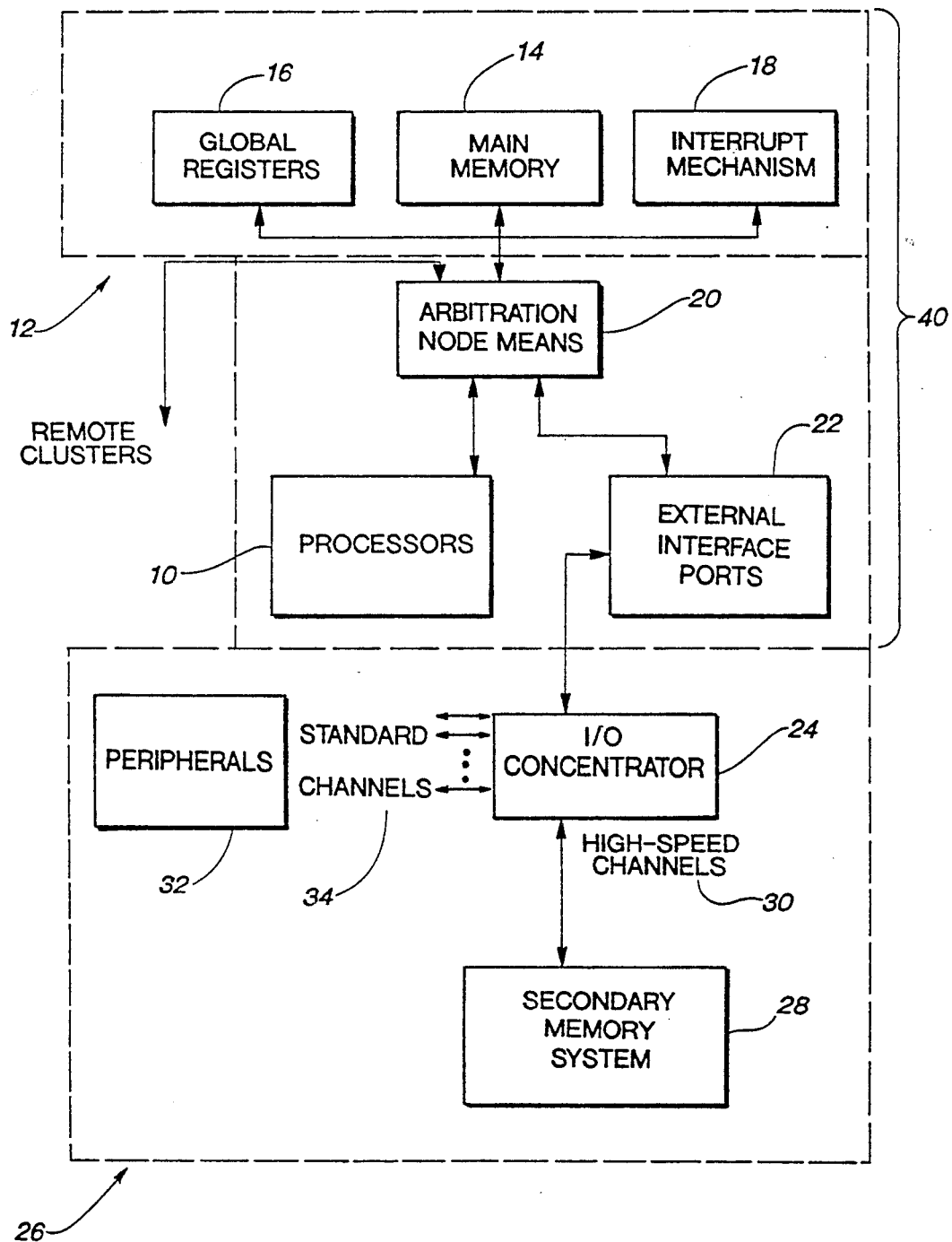
FIG. 1 is a block diagram of a single multiprocessor cluster of the preferred embodiment of the present invention.

Referring to FIG. 1, the architecture of a single multiprocessor cluster of the preferred embodiment of the multiprocessor system for use with the present invention will be described. The preferred cluster architecture for a highly parallel scalar/vector multiprocessor system is capable of supporting a plurality of high-speed processors 10 sharing a large set of shared resources 12 (e.g., main memory 14, global registers 16, and interrupt mechanisms 18). The processors 10 are capable of both vector and scalar parallel processing and are connected to the shared resources 12 through an arbitration node means 20. Also connected through the arbitration node means 20 are a plurality of external interface ports 22 and input/output concentrators (IOC) 24 which are further connected to a variety of external data sources 26. The external data sources 26 may include a secondary memory system (SMS) 28 linked to the input/output concentrator 24 via a high speed channel 30. The external data sources 26 may also include a variety of other peripheral devices and interfaces 32 linked to the input/output concentrator 24 via one or more standard channels 34. The peripheral devices and interfaces 32 may include disk storage systems, tape storage systems, printers, external processors, and communication networks. Together, the processors 10, shared resources 12, arbitration node means 20 and external interface ports 22 comprise a single multiprocessor cluster 40 for a highly parallel multiprocessor system in accordance with the preferred embodiment of the present invention.

Figure 2A:
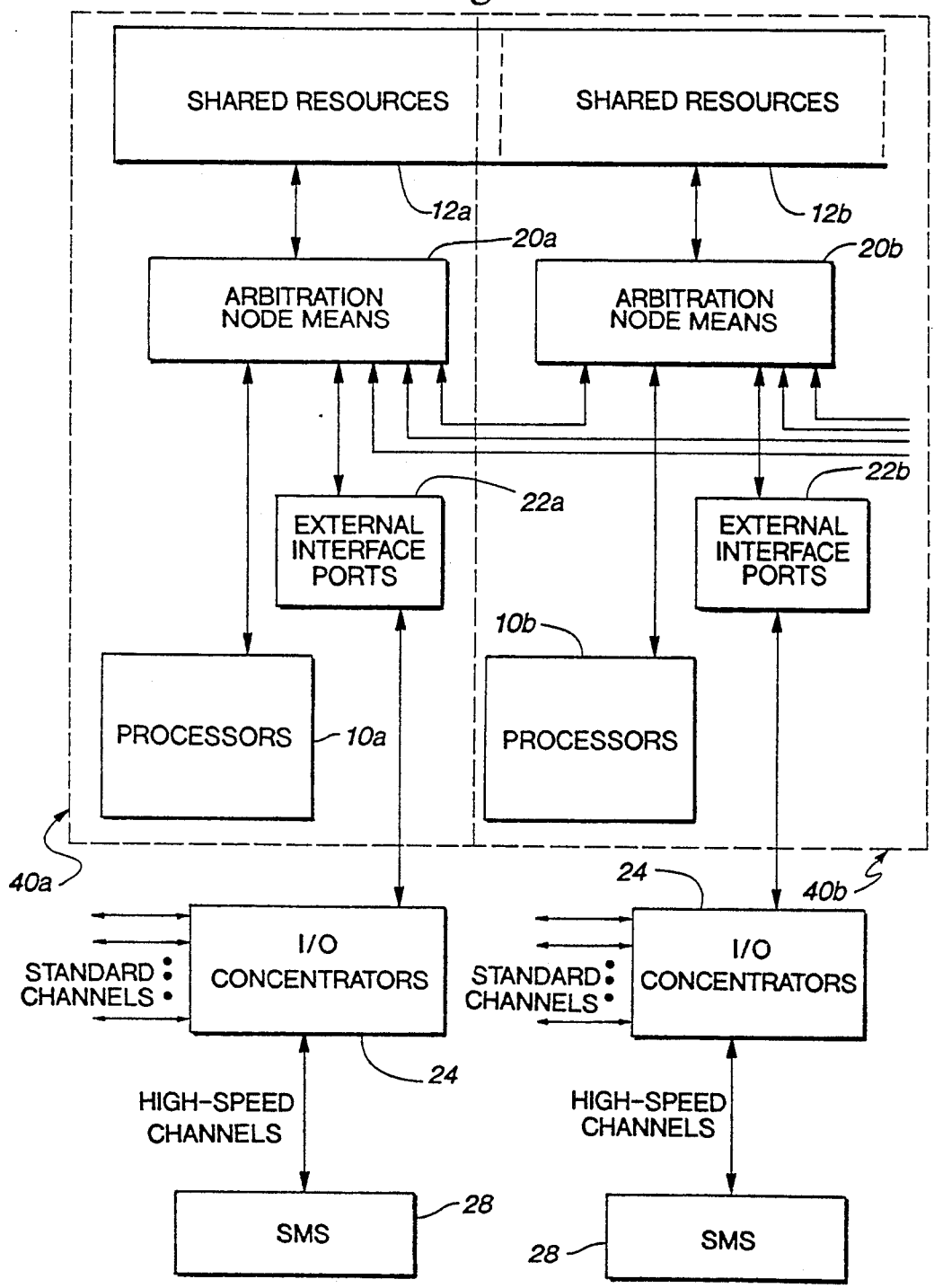
FIGS. 2a and 2b are a block diagram of a four cluster implementation of the preferred embodiment of the present invention.
Figure 2B:
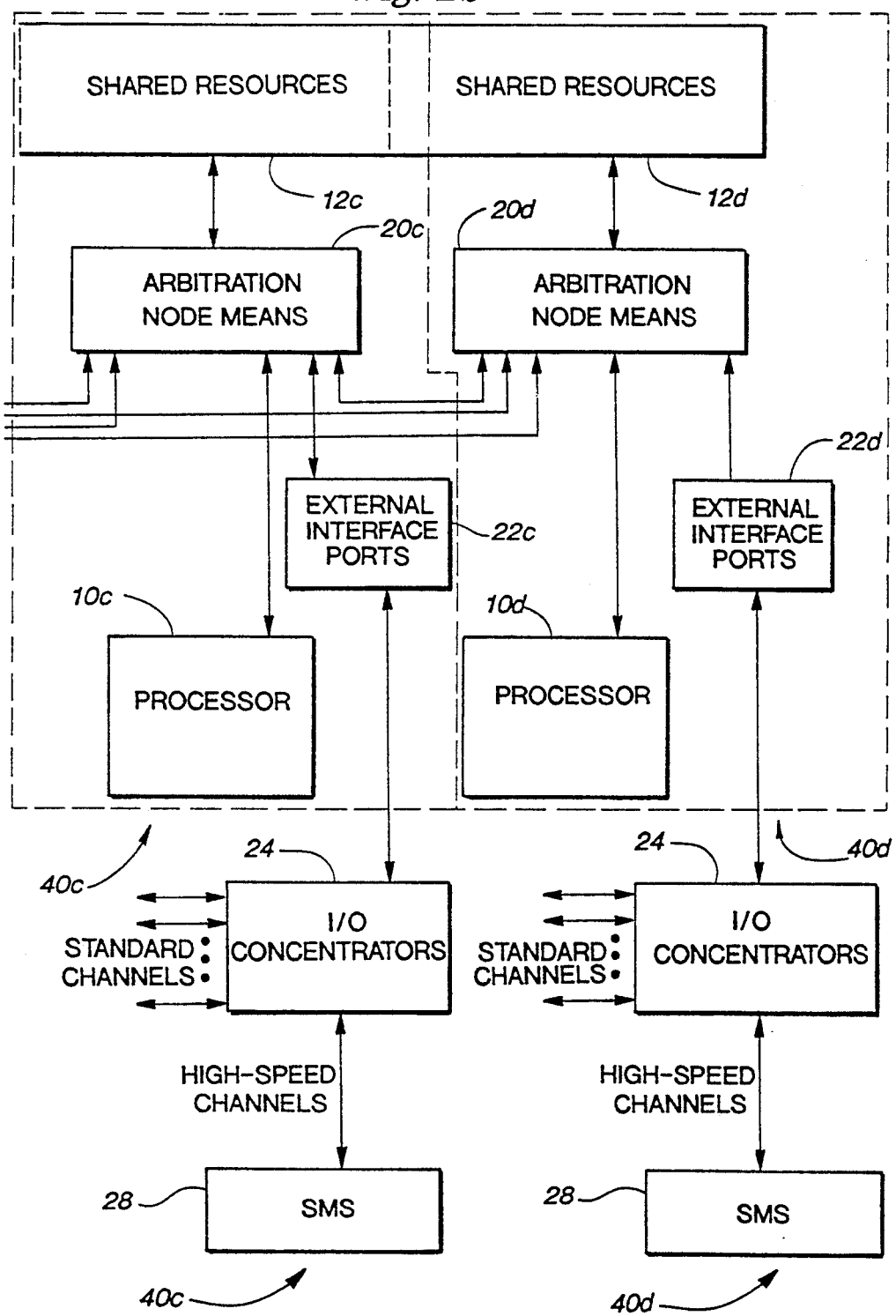

The preferred embodiment of the multiprocessor clusters 40 overcomes the direct-connection interface problems of present shared-memory supercomputers by physically organizing the processors 10, shared resources 12, arbitration node means 20 and external interface ports 22 into one or more clusters 40. In the preferred embodiment shown in FIGS. 2a and 2b, there are four clusters: 40a, 40b, 40c and 40d. Each of the clusters 40a, 40b, 40c and 40d physically has its own set of processors 10a, 10b, 10c and 10d, shared resources 12a, 12b, and 12c and 12d, and external interface ports 22a, 22b, 22c and 22d that are associated with that cluster. The clusters 40a, 40b, 40c and 40d are interconnected through a remote cluster adapter 42 that is a logical part of each arbitration nodes means 20a, 20b, 20c and 20d. Although the clusters 40a, 40b, 40c and 40d are physically separated, the logical organization of the clusters and the physical interconnection through the remote cluster adapter 42 enables the desired symmetrical access to all of the shared resources 12a, 12b, 12c and 12d across all of the clusters 40a, 40b, 40c and 40d.

Referring now to FIG. 3, the preferred embodiment of the arbitration node means 20 for a single cluster 40 will be described. At a conceptual level, the arbitration node means 20 comprises a plurality of cross bar switch mechanisms that symmetrically interconnect the processors 10 and external interface means 22 to the shared resources 12 in the same cluster 40, and to the shared resources 12 in other clusters 40 through the remote cluster adapter means 42. Typically, a full cross bar switch would allow each requestor to connect to each resource where there are an equivalent number of requestors and resources. In the present invention, the arbitration node means 20 allows a result similar to a full cross bar switch to be achieved in the situation where there are more requestors than resources. In the preferred embodiment, the arbitration node means 20 is comprised of sixteen arbitration nodes 44 and the remote cluster adapter means 42. The remote cluster adapter means 42 is divided into a node remote cluster adapter (NRCA) means 46 and a memory remote cluster adapter (MRCA) means 48. The NRCA means 46 allows the arbitration node 44 to access the remote cluster adapter means 42 of all other multiprocessor clusters 40. Similarly, the MRCA means 48 controls access to the shared resources 12 of this cluster 40 from the remote cluster adapter means 42 of all other multiprocessor clusters 40.

In this embodiment, the sixteen arbitration nodes 44 interconnect thirty-two processors 10 and thirty-two external interface means 22 with the main memory 14 and the NRCA means 46. Each arbitration node 44 is connected with the main memory 14 by eight bidirectional parallel paths 50. A single parallel bidirectional path 52 connects each arbitration node 44 with the NRCA means 46. In the preferred embodiment, the same path 52 from each arbitration node 44 is also used to connect the arbitration node 44 with the global registers 16 and the interrupt mechanism 18, although it will be recognized that separate paths could be used to accomplish this interconnection. As explained in greater detail hereinafter, the minimum ratio of processors 10 to arbitration nodes 44 is 2:1. Accordingly, the maximum number of arbitration nodes 44 per cluster 40 is 128.

Like each of the arbitration nodes 44, the MRCA means 48 is connected with the main memory 14 by eight parallel bidirectional paths 54. Similarly, a single parallel bidirectional path 56 connects the MRCA means 48 with the global registers 16 and interrupt mechanism 18. A total of six parallel bidirectional paths 58 are used to interconnect the cluster with two bidirectional paths 58 from each cluster to every other cluster. For example, cluster 40a has two paths 58 that connect with each cluster 40b, 40c and 40d. In this manner, the MRCA means 48 allows other clusters 40 to have direct access to the shared resources 12 of this cluster 40.

For a more detailed description of the preferred embodiment of the multiprocessor clusters 40, reference is made to the parent application previosly identified.

Overview

Figure 4A:
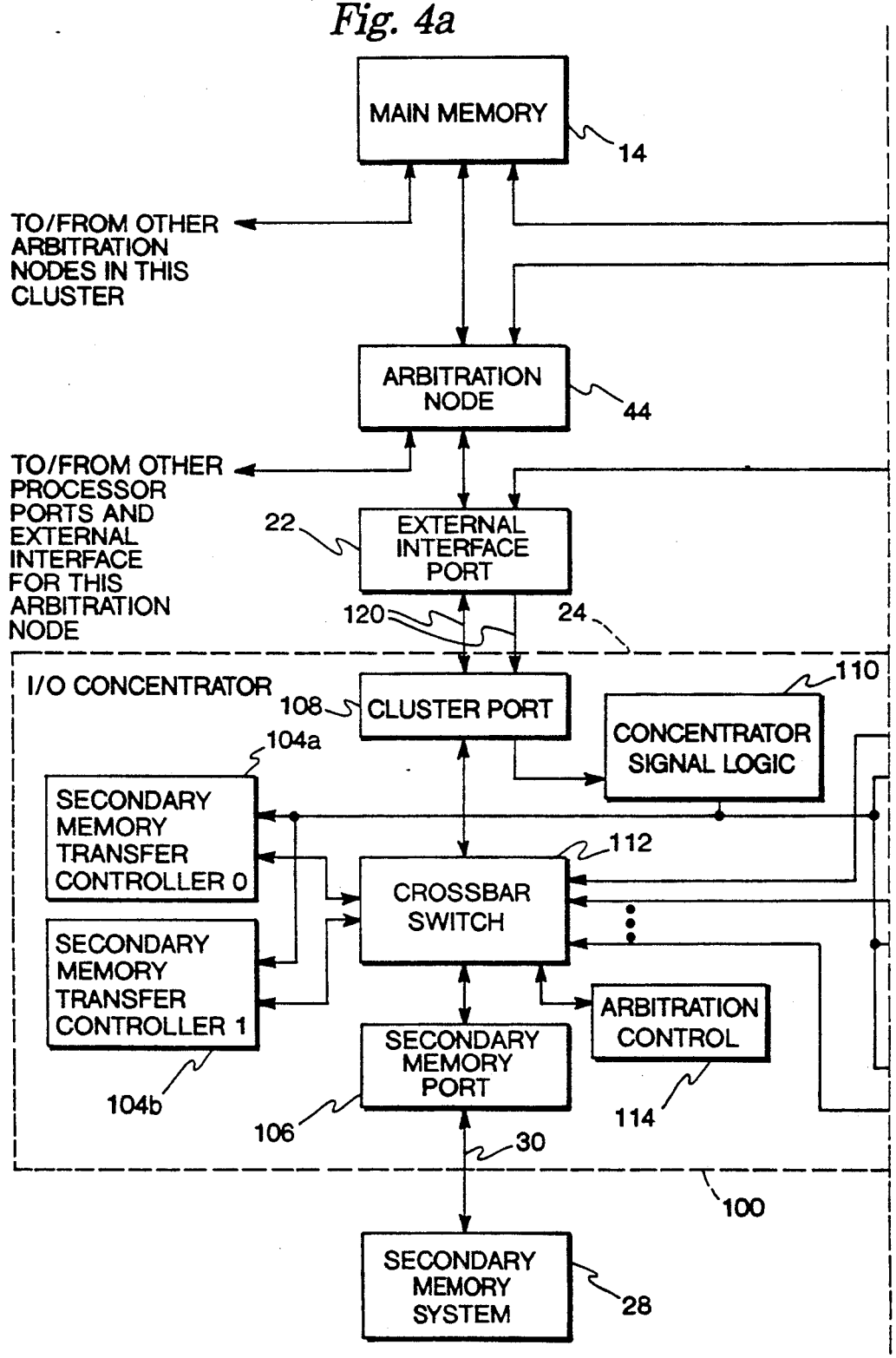
FIG. 4 is an overall block diagram of the input/output architecture of the present invention.
Figure 4B:
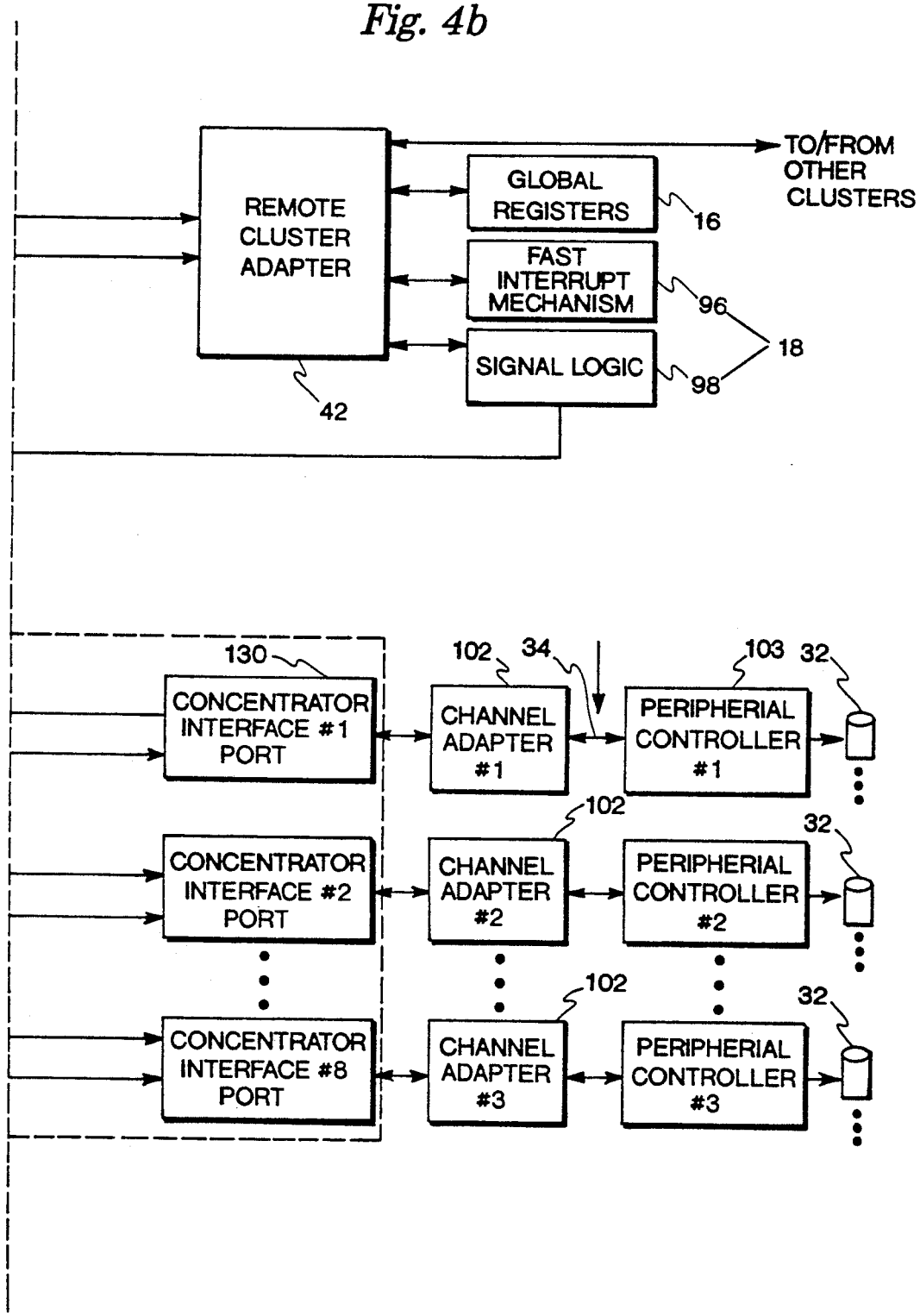

Referring now to FIG. 4, the architecture for the input/output system of the present invention will be described. The input/output peripheral devices 32 are connected through the standard channels 34, the input/output concentrator 24 and the external interface ports 22 to the main memory (MM) 14 and global registers 16 and can directly read and write to these shared resources 12 within the same cluster 40, as well as in other clusters 40. The peripheral devices 32 can also read and write to secondary memory (SM) in the secondary memory system (SMS) 28 associated with the same cluster 40a, for example, but cannot access the SMS 28 in other clusters 40b–40d. It should be noted that a path is not available to allow processors 10 and peripheral devices 32 to directly exchange data. Any such exchanges must take place through main memory 14, SMS 28 or the global registers 16.

The input/output concentrator (IOC) 24 contains the data paths, switches, and control functions to support data transfers among the various input/output components. In the preferred embodiment, either eight or sixteen IOC's 24 are physically located within a single input/output chassis 100. Each IOC 24 supports up to eight channel adapters 102 that interface to the standard channels 34 and the peripheral controllers 103, a secondary memory transfer controller (SMTC) 104 that controls a secondary memory port 106 to the high speed channel 30 and the SMS 28, a cluster port 108 that connects to the external interface ports 22, concentrator signal logic 110 that distributes interrupt signals to the channel adapters 102 and the SMTC 104, and a data path crossbar switch 112. Each IOC 24 can read or write a single, 64-bit word in main memory 14 every other clock cycle. The IOC 24 can also read or write a word to the SMS 28 while simultaneously accessing main memory 14.

Each channel adapter 102 contains the functions necessary to exchange data with an input/output peripheral device 32 over a standard input/output channel 34. The channel adapters 102 access main memory 14, SMS 28 and global registers 16, and send signals to the processors 10 through the IOC 24. The cross bar switch 112 in the IOC 24 multiplexes access requests among the channel adapters 102 attached to it, routing data to the destination selected by a given transfer. All eight channel adapters 102 requesting data at the maximum rate require the maximum available rate from main memory 14 or the maximum available rate from SMS 28.

The SMTC 104 governs the exchange of blocks of data between main and the SMS 28. These exchanges can proceed at the rate of one word every other clock cycle, which is the maximum rate possible for the memory port 108. All eight channels adapters 102 and a secondary memory request from the SMTC 104 may be active at the same time. Because the SMTC 104 is capable of requesting all available memory cycles, the relative allocation of cycles between the SMTC 104 and the channel adapters 102 is selectable. The SMTC allocation can range from all available to no memory cycles. This allocation is specified to the SMTC 104, along with other transfer parameters when the transfer is started. The IOC 24 uses this priority when allocating memory access among active requestors.

The cross bar switch 512 allows up to four transfers to occur in parallel each cycle. The possible sources and destinations are: (1) to main memory from a channel adapter or secondary memory; (2) to secondary memory from a channel adapter or main memory; (3) to a channel adapter from secondary memory; and (4) to a channel adapter from main memory. Priority among the channel adapters 102 is based on a multiple request toggling priority scheme as described in further detail in the previously identified co-pending application entitled METHOD AND APPARATUS FOR A MULTIPLE REQUEST TOGGLING PRIORITY SYSTEM. Channel requests may be between 1 and n words in length. The bandwidth of the switch and input/output priority scheme is high enough to guarantee that all channels can be serviced at their maximum transfer rate. Activity in the cross bar switch 112 is governed by an input/output arbitration control network 114 similar to the arbitration networks described in the parent application which handles the resolution of competing requests in accordance with the priority allocation between the SMTC 104 and the channel adapters 102.

In the preferred embodiment of the multiprocessor system, up to thirty-two IOCs 24 may be connected to a single cluster 40, one per external interface port 22. The total input/output subsystem for each cluster 40 is capable of supporting 256 standard channels 34 (8 per concentrator means) and thirty-two SMTC pairs 104. Only full word (64-bit) access is supported, i.e., there are no partial word reads or writes. References to the input/output subsystem are also constrained to be aligned on full word boundaries, i.e. no byte offset is supported. A reference can be made to any address in any cycle. Requests for main memory transfers (reads or writes) may be initiated by either the peripheral controller 103 through the channel adapters 102 or the SMTC 104. Error detection and correction is done at the cluster port 108.

As described in greater detail in the previously identified co-pending application entitled METHOD AND APPARATUS FOR NON-SEQUENTIAL MEMORY ACCESS, main memory read and write operations can complete out of order. As with the processors 10, an input/output peripheral device 34 and the SMTC 104 can also use the Data Mark mechanism to determine when all prior references have completed. A marked reference is acknowledged by the memory system when the data has been written into memory. The channel adapters 102 or SMTC 104 can mark any block or group of references. All subsequent requests for this requestor are ignored until the marked writes have cleared the memory system.

As discussed in greater detail in connection with the previously identified co-pending application entitled SIGNALLING INTERRUPT MECHANISM FOR A MULTIPROCESSOR SYSTEM, input/output peripheral devices 32 and the SMTC 104 are able to send and receive signals to the processors 10 in the same and other clusters 40. Signalling a processor 10 interrupts that processor's instruction execution stream, typically invoking an interrupt handler. As described in greater detail in the previously identified co-pending application entitled SOFTWARE ARCHITECTURE FOR A HIGHLY PARALLEL MULTIPROCESSOR SYSTEM, sending a signal to an input/output peripheral device 34 causes the signalled device to take action characteristic of that device. A typical result is to cause the device to fetch a block of command information left in main memory.

The defined input/output architecture exposes to peripheral devices 32 on the remote end of a standard channel 34 all of main memory 14 and the secondary memory 28, as well as the global registers 16 and interrupt mechanism 18. The peripheral controller 103 assumes the role of initiator of block data transfers to and from memory. As a result, a non-traditional communication protocol between host and peripheral has been designed and implemented. A summary of this command block model is described below.

The operating system, because it runs as a privileged process, is the only programmed entity which communicates with a peripheral controller 103. It initiates this activity at the request of an individual user job running on the multiprocessor system. Upon receiving such a request, the operating system will allocate an area of main memory 14 called a command block. The command block is part of the OSSRs and is filled in with information specific to the peripheral device 32, such as whether the request is to store or fetch, the source or destination of the data, the length of the transfer, and other device-specific information. The location of the data buffer associated with the command block, if any, may be either in main memory 14 or secondary memory 28. For a more detailed description of how the atomic resource allocation mechanism operates, reference is made to the previously identified co-pending application entitled GLOBAL REGISTERS FOR A MULTIPROCESSOR SYSTEM.

Command Blocks

Because the preferred embodiment contains multiple processors, it is highly likely that at some point in time two or more processors 10 might wish to make a request of the same peripheral device 32. In order to assure that only one process at a time accesses the peripheral command block, the global registers 16 are used to implement a semaphore-like atomic resource allocation mechanism. The atomic resource allocation mechanism serves as a lock on the particular command block. An operating convention used by all processes which share access to the OSSRs, including the peripheral command blocks assure that only one process, and hence only one processor 10, can own the lock at a time.

When the command block is completely initialized, the operating system will send a signal to the peripheral controller 103 to indicate that there is work for it to do. The peripheral controller 103 will then initiate a read operation across the standard channel 34, fetching the command block. When the command block contents are returned to the peripheral controller 103, it will perform the requested operation. The operation will typically require the peripheral controller 103 to store or fetch data from a buffer in either main memory 14 or secondary memory 28. The peripheral controller 103 performs the operation by managing the physical operation associated with the data transfer to or from the peripheral device 32 and initiating commands over the standard channels 34. In the preferred embodiment, the peripheral controller directly controls the physical problems associated with controlling the peripheral device (e.g., disk, tape, etc.). Alternatively, the peripheral controller could communicate with another traditional disk controller or the functions of the peripheral controller could be physically incorporated in the peripheral device.

When the peripheral device 32 has completed the requested input/output operation, the peripheral controller 103 will then write the command block back to main memory 14 with information indicating the completion and status of the transfer. If an error occurred, this information is transmitted in the command block as well. Finally, the peripheral controller 103 will initiate a signal across the standard channel 34, directed towards one of the processors 10. The appropriate device handler is called by the operating system which will then clear the command block, release the lock making it available for the next process waiting to use it, and transmit the input/output operation information back to the user process making the request. The operation of the device handler is described in greater detail in the previously identified co-pending application entitled SOFTWARE ARCHITECTURE FOR A HIGHLY PARALLEL MULTIPROCESSOR SYSTEM.

It is this interaction between peripheral controller 103 and the operating system using data structures in the OSSR's such as command blocks, signals, and semaphore operations on global registers 16 that allows the parallel, extensible input/output architecture to function with a minimum of operating system intervention. The peripheral controllers 103 and SMTC 104 fetch their own commands, execute operations, and return the results independently of processor activity. Since access to the command blocks can be shared by all processors in the system, the input/output management process can be executing in all, some, or only one of the processors in the system at any moment, allowing considerable flexibility in managing system resources to meet operational demands.

Cluster Channel Interface

Referring to FIG. 4, it will be seen that communication between the shared resources 12 in the cluster 40 and the IOCs 24 takes place over a plurality of cluster channel interfaces (CCI) 120, one cluster channel interface 120 between each external interface port 22 and IOC 24. Stores and fetches to or from main memory 14, the global registers 16, and the interrupt mechanism 18 can be initiated over the CCI 120. In addition, signals can be sent to any destination in the multiprocessor system from any CCI 120. The external interface ports 22 converts transactions on the CCI 120 into single-word references to the shared resources. The arbitration nodes 44 accept requests from up to two external interface ports 22 and up to two sets of processor memory ports, and routes the requests to the appropriate shared resource.

The cluster channel interface (CCI) 120 consists of two, eight-byte data busses, one for stores to the cluster 40 and one for fetches from the cluster 40, and a number of control lines. The cluster port 108 in the input/output concentrator and the external interface ports 22 in the cluster 40 exchange data over the data busses that make up the CCI 120. Both the channel adapters 102 and the SMTC 104 are able to initiate transactions with the shared resources 12 over the CCI 120.

Communication between the IOC 24 and the SMS 28 takes place over the high-speed channel 30. Stores or fetches to the SMS 28 can be initiated over the high-speed channel 30. The high-speed channel 30 consists of two data busses, one for stores to the SMS 28 and the other for fetches, and a number of control lines. Both the channel adapters 102 and the SMTCs 104 are able to initiate transactions with SMS 28 over the high-speed channel 30.

Communication between the channel adapters 102 and the IOC 24 takes place over a data port called the concentrator interface port (CIP) 130. Each CIP 130 operates independently of other CIPs 130 on the IOC 24. Commands initiated at the CIPs 130 by the channel adapters 102 are routed by the IOC 24 to either the CCI 120 through the cluster port 108 or to the high-speed channel 30 through the secondary memory port 106 as required to satisfy the command.

Packets

Data moving through the input/output system is organized in data structures called packets. A packet consists of a group of data words and an associated command word. The command word, always the first word in a packet, contains information used to direct data to the appropriate destination. The packet format is different as used at the CIPs 130, the secondary memory port 106 and high-speed channel 30, and the cluster port 108 and CCI 120. In the preferred embodiment, packets with both data and command are transferred to the destination, but only data is returned from the destination. Each of these busses and their associated data packet formats is described below.

CCI Packets

Figure 5A:
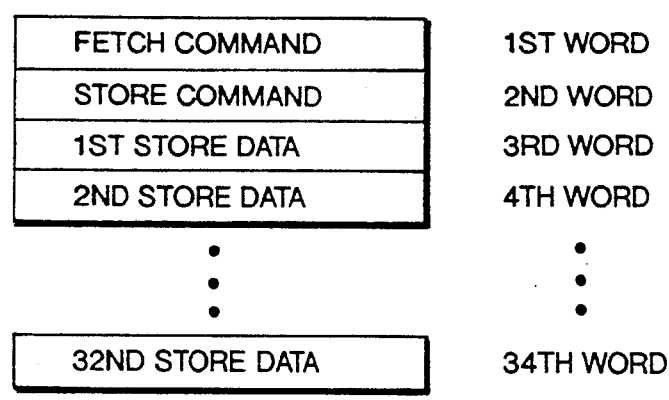
Figure 5B:
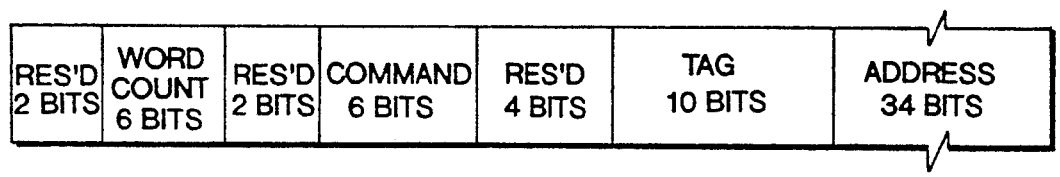

The format of the packets on the CCI 120 is shown in FIG. 5a. The CCI packet consists of a fetch command word, a store command word, and from zero to 32 data words associated with the store command. The format for the command words is the same for both store and fetch commands and is shown in FIG. 5b. The various types of commands for the CCI packet are listed in FIG. 5c. The command word consists of four fields:

Word Count Field-indicates the number of words to be stored or fetched with this command. Can range between 0 and 32 (no-operation commands have no data words).

Tag Field-used to identify the source of the request. For fetch commands, the tag is used to return fetched data to the requesting device. For store commands, the tag is not used except in mark operations Command Field-indicates the type of command to be performed.

Address Field-contains the first address in the shared resources to be accessed by the indicated operation.

CCI packets are transmitted by the IOC 24 over the CCI 120 as soon as possible. In a busy system, packets initiated by the channel adapters 102 will be interleaved with each other and with packets initiated by the SMTCs 104 and presented on the CCI 120 as CCI packets. FIG. 6 illustrates a sample transfer showing interleaving among packets.

SMTC Packets

Figure 7A:
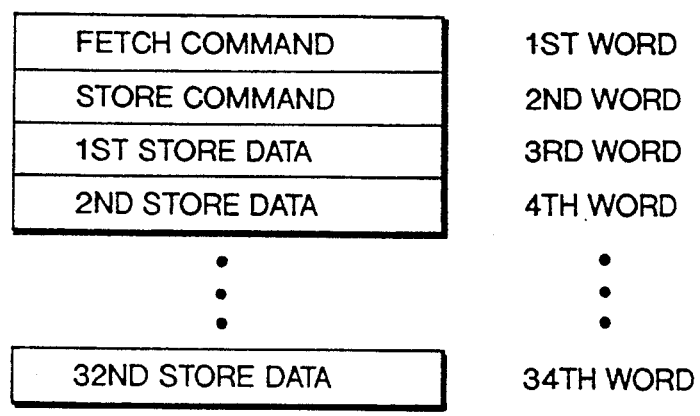
Figure 7B:

The format for the packets on the high-speed channel 30 sent to the SMS 28 is shown in FIG. 7a. The SMTC packets are handled by the SMTC 104 and consist of a fetch command word, a store command word, and either zero or 32 data words. The format for the command words is the same for both store and fetch commands and is shown in FIG. 7b All secondary memory operations except reset assume a word count of 32 words—the size of a single SMS block. The various types of commands for the SMTC packet are listed in FIG. 7c. The command word for SMTC packets consists of two fields:

Command Field-indicates the type of command to be performed.

Block Address Field-contains the address of the block in secondary memory that will be referenced by the indicated operation.

CIP Packets

Figure 8A:
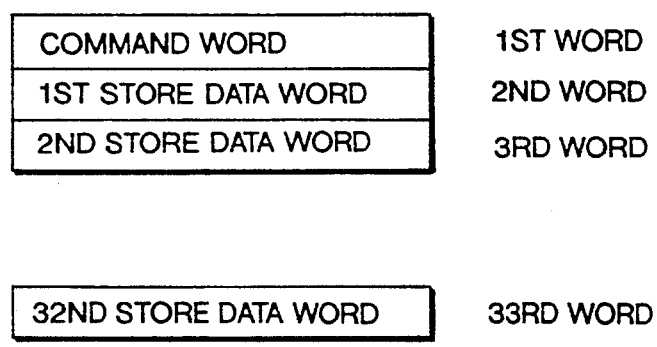
FIGS. 8a and 8b show the format of the CIP packets, the command word format for the CIP command.
Figure 8B:
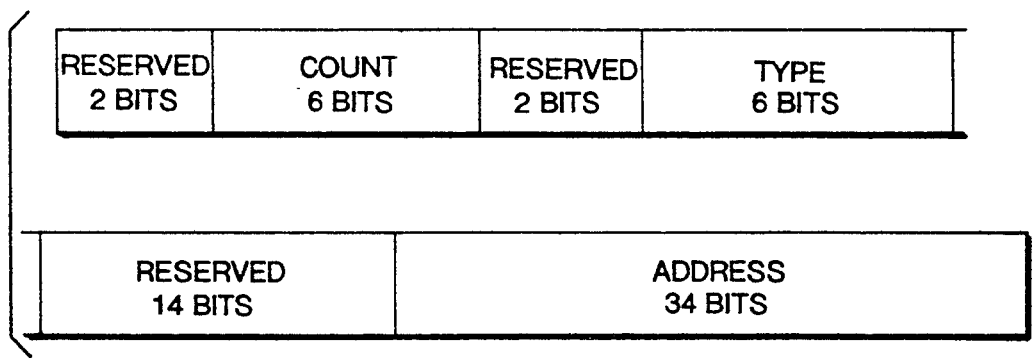

Commands and data to be from the channel adapter 102 to the CIP 130 are organized into CIP packets of 64-bit words. The format for the CIP packets is shown in FIG. 8a. A CIP packet is a logical group of interface words, from 1 to 33 words in size. The first word of a CIP packet is by definition the command word for the packet, followed by any optional data associated with that command. As shown in FIG. 8b, the command word contains the type of operation to be performed in the shared resources, the address where the operation is to take place, and a count of the number of words associated with that command.

Four operational command types are permitted at the CIP 130 (1) fetch references, (2) store references, (3) semaphoring conditional store with fetch, and (4) signal transmission. The command word can address one of four sources: (1) main memory 14, (2) secondary memory 28, (3) global registers 16 (including the SETN registers), or (4) signal targets.

The type field represents the transaction requested for the various commands. FIG. 5c shows the type field identifiers and their respective operations for non-marking operations. MARKing commands are those intended to prevent further transactions from the channel until the write data has been received at its destination. The IOC will prevent further transactions by not processing any further commands in its command queue until the MARKed operations are completed. MARK commands from input/output force all prior stores associated from that channel to be completed in memory before any subsequent commands are initiated.

The word count field represents the number of words to be transferred utilizing this command word. The field allows for up to 32 words to be transferred, although certain restrictions pertain. Table I lists any restrictions based upon the source/destination addressed.

TABLE I

| Source/Destination | Restrictions |
|---|---|
| Main Memory | 1 to 32 words |
| Secondary Memory | 32 words |
| Global Registers | 1 word |
| Signal Target | 1 word |

Store-type command packets contain the data to be stored in the packet with the command word, from one up to 32 words in a single packet. The address in the command word is the address in the referenced shared resources where the first data word in the packet will be stored. The next word in the packet (if present) will be presented at location (command word address + 1), the third (if present) will be presented at location (command word address + 2), and so on until all words in the packet are stored. The only address pattern supported for adjacent words in a packet is unity increment.

Fetch-type packets contain only the command word. The referenced data is returned via the concentrator interface read bus sometime after the fetch command word is presented on the concentrator interface store bus 226. A fetch packet may return from 1 to 32 words. The first word returned is always the data at (command word address) in the referenced shared resource. The next data word returned (if requested) will be from (command word address + 1), the third word returned (if requested) will be from (command word address + 2), and so on. The only addressing pattern supported for fetch packets at the CIP 130 is unity increment.

One of the shared resources, the global registers 16, supports a read-modify-write operation that combines both a store and fetch operation in a single command, called a "semaphoring conditional store with fetch", or semaphore operation. The semaphore-type command packet presented on the store bus contains the single data word to be stored. Some time later the resulting fetch data will be returned on the fetch bus.

The Loadf (Load and flag) operation is described in greater detail in the previously-identified co-pending application entitled METHOD AND APPARATUS FOR A LOAD AND FLAG INSTRUCTION, Ser. No. 07/536,217.

IOC Data Paths

Figure 9A:
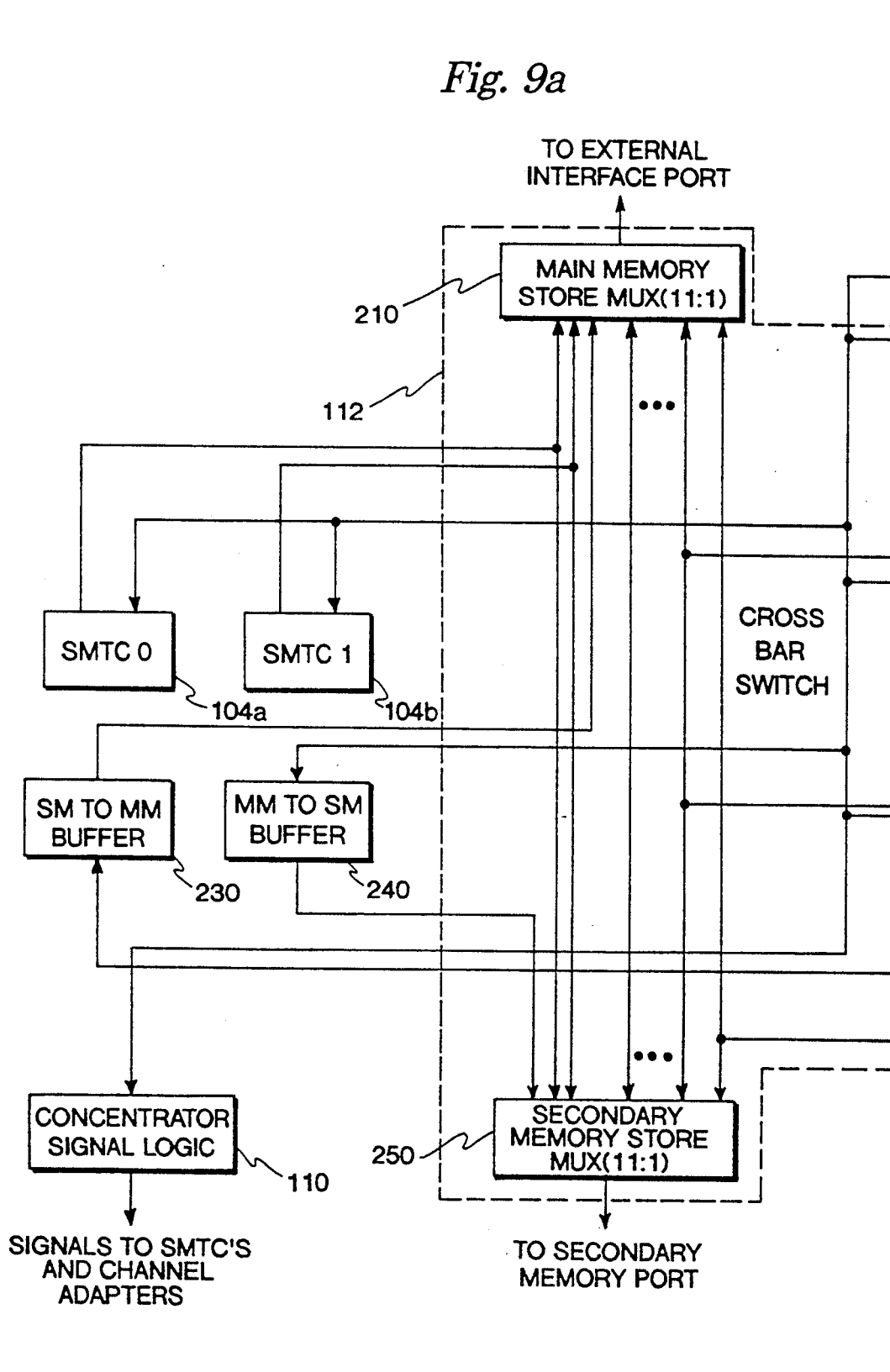
FIG. 9 is a block diagram of the data paths for the input/output concentrator.
Figure 9B:
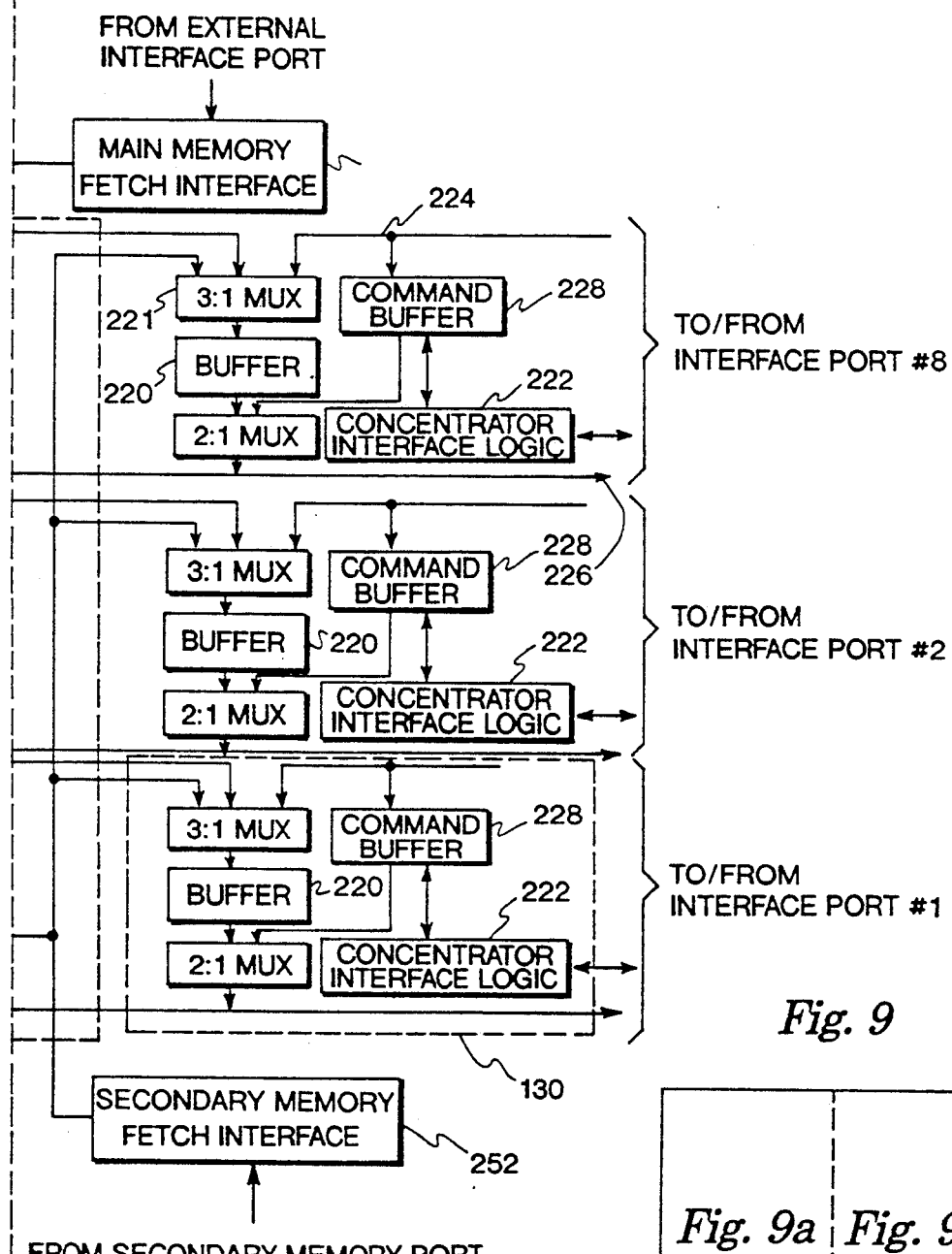
Figure 9:
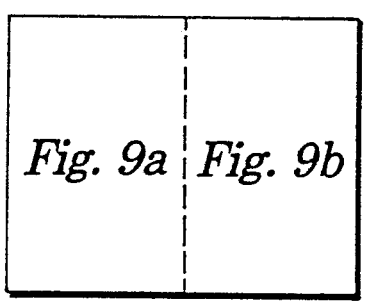

Referring now to FIG. 9, the various data paths internal to the IOC 24 will be described. CCI packets to be stored are transmitted to main memory 14 (or to global registers 16, or to the interrupt mechanism 18) to the external interface ports 22 through a Main Memory Store Mux 210. Eleven possible sources are selected: the eight concentrator interface buffers 220, the SM to MM buffer 230, and the two SMTCs 104a and 104b.

In the preferred embodiment, there are two SMTCs 104a and 104b that store status information in main memory 14 at the conclusion of a secondary memory transfer, one for transferring information in each direction. SMTC packets to be stored in SMS 28 are transmitted through the Secondary Memory Store Mux 250. Eleven possible sources are selected: the eight concentrator interface buffers 220, the MM to SM buffer 240 and the two SMTCs 104a and 104b.

Data is received from either main memory 14 or secondary memory 28 through the respective interfaces, main memory fetch interface 212 and secondary memory fetch interface 252. These interfaces are connected to all possible destinations: the eight CIPs 130, the two SMTCs 104 (for MM fetches only), the concentrator signal logic 110 (from the MM fetch interface 212 only), the MM to SM buffer 240 (for MM fetches to be stored in SM), and the SM to MM buffer 230 (for SM fetches to be stored in MM).

Signals are sent to the IOC 24 via dedicated control lines in the external interface port 22 and the cluster port 108. Logic in the main memory fetch interface 212 of the cluster port 108 recognizes signal commands and directs them to the concentrator signal logic 110.

The SM to MM buffer 230 is used to hold data fetched from the SMTC 104 while waiting for access to the main memory store mux 210. Similarly, the MM to SM buffer 240 is used to hold data fetched from the main memory 14 while waiting for access to the secondary memory store mux 250. The SMTCs 104 fetch their command information from main memory 14, but not from the SMS 28.

As previously described, operation of the IOC 24 is based on moving packets of data and their associated command information between source and destination. Data from the CIPs 130 is held in the concentrator interface buffers 220 until a complete packet is received. When a complete packet is received at the CIP 130, the concentrator interface logic 222 examines the command word associated with that packet stored in a command buffer 228 and requests access to the path through the cross bar switch 122 to the resource selected by that command. When access to that path is granted by the arbitration network 114 in the cross bar switch 112, the concentrator interface logic 222 first transmits the command word for that packet, followed by any data words associated with that command word. The command word is used at either the external interface ports 22 or the secondary memory port 106 to perform the requested operation and to calculate the address where the operation is to be performed.

Several CIPs 130 may request access to any path at the same time. The arbitration network 114 resolves requests from multiple concentrator interface means by using the Multiple-Request Toggling (MRT) priority allocation method as described in greater detail in the previously identified co-pending application entitled METHOD AND APPARATUS FOR A MULTIPLE REQUEST TOGGLING PRIORITY SYSTEM. The MRT method changes the relative priority of each requestor in relation to every other requestor based on the order of prior requests and grants. The first interface to request access is the first to be granted access. Priorities are updated after a grant is issued. The granted requestor is moved to the lowest priority. Although the preferred embodiment of the cross bar switch 112 and arbitration network 114 are described in terms of the MRT arbitration method, it will be recognized that many other types of arbitration schemes and cross bar switches may also be utilized in accordance with the present invention.

Transfer requests from either SMTC 104 for command and status information do not participate in this scheme. SMTC command or status requests are always serviced at the next opportunity. If both SMTCs 104a and 104b request transfers at the same time, then SMTC0 (104a) is granted first access.

Figure 10:
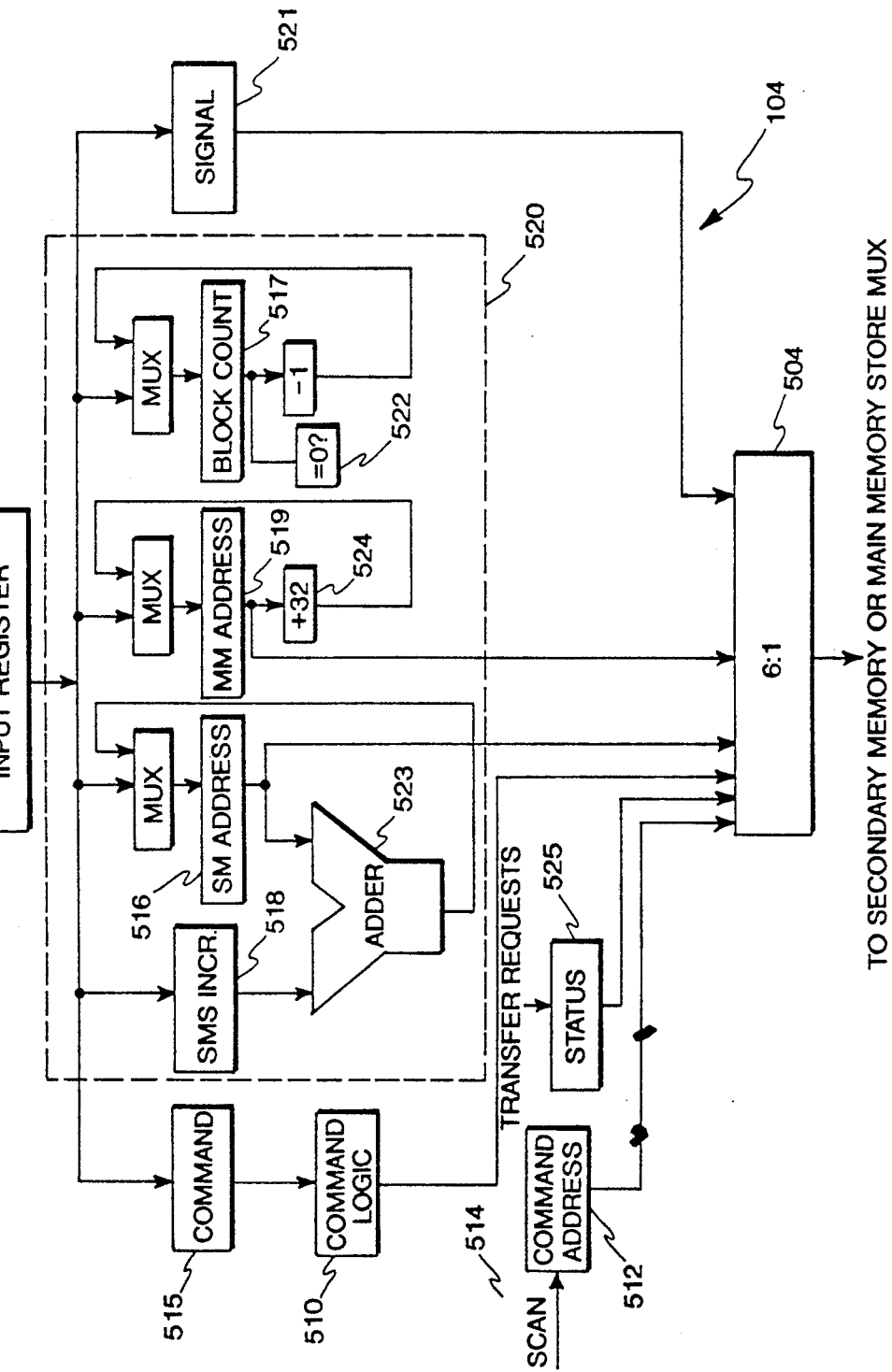
FIG. 10 is a block diagram of the data paths for the secondary memory transfer controller.

Referring now to FIG. 10, the operation of the SMTC data paths will be described. Data moving between main memory 14 and the SMS 28 is also transferred in packets. In the preferred embodiment, there are two SMTCs 104, SMTC0 (104a) and SMTC1 (104b), one for each transfer direction (MM to SM and SM to MM). Both SMTCs 104 operate in the same manner, with adjustments in procedure to allow for the different transfer direction. The SMTC command logic 510 initiates the transfer by sending a command word to the appropriate memory to begin a fetch of the first 32-word block. The SMTC address logic 520 calculates the proper address, appends the command and tag fields, and requests access to the appropriate store path. When access is granted by the arbitration network 114, the SMTC command logic 510 transmits the command word through the appropriate store mux 210 or 250. After some delay, the final word of the block arrives in appropriate buffer 230 or 240. Then the entire block is present in the buffer, the SMTC command logic 310 requests access to the appropriate store mux 210 or 250 to send the block. The SMTC address logic 520 calculates the proper address, appends the command and tag fields, and, when access is granted, delivers the command word to the store mux 210 or 250, followed immediately by the data from the buffer 230 or 240 that contains the data packet. Requests are made until sufficient packets have been transferred to satisfy the block count specified in the transfer control block portion 222 of the SMTC address logic 220.

Concentrator Function

The input/output concentrator (IOC) 24 derives its name from its function of concentrating relatively slow transfers from up to 8 channel adapters 102 into a single, much faster transfer into either main memory 14 or the SMS 28. For Stores, this function is performed by collecting complete packets in the concentrator interface buffers 220 at the lower channel rate and then emptying all concentrator interface buffers 230 into either main memory 14 or secondary memory 28 at the higher memory port rate. For Fetches, this function is performed by filling the concentrator interface buffers 230 at the memory port rate, and then emptying the buffer at the lower channel rate. The IOC 24 is designed to operate best when the transfer rate across each CIP 130 is ⅛th that of the rate into either main or secondary memory. At this ratio, the IOC 24 can empty all eight concentrator interface buffers 220 and store their contents into either of the memories in the time it takes any one CIP 130 to fill the buffer 220 (or fill all eight buffers in the time it takes any one CIP 130 to empty its buffer 220).

Data is moved to main or secondary memory in packets no larger than 32 words. Because each CIP 130 has a 64-word buffer, two packets can be held in a concentrator interface buffer 220 at any time. This feature allows one packet to be loaded into the buffer while another is being read out. For stores into either memory, and for fetches from secondary memory, packet transfers from the concentrator interface buffers 220 are interleaved within the IOC 24 such that all data associated with a single packet is stored into the destination memory before another packet transfer is started.

Referring again to FIG. 9, it will be seen that the MM and SM port paths are independent of each other. A number of CIPs 130 and SMTC1 (104b) can store into main memory while the remaining CIPs 130 and SMTC0 (104b) can store into the SMS 28. The CIPs 130 operate at a slower transfer rate than either the CCI 120 or the high-speed channel 30, while the SMTCs 104 are capable of operating at the memory port rate. All together, the sum of the transfer rates from all CIPs 130 and the rates from both SMTCs 104 can exceed the ability of either memory port 106 or 108 to support the transfers. If the SMTC transfers are always highest priority, the CIPs 130 will receive no grants, and transfers will stop. If all channels are operating at their highest rate and all are trying to write or to read from one memory, the SMTCs will receive no grants. In order to allow the operating system to manage the allocation of transfer bandwidth between the SMTCs 104 and the CIPs 130, the priority of SMTC data transfers can be adjusted with respect to the CIPs 130 (but SMTC command fetches and status reporting are always the highest priority). This adjustment is made by forcing the SMTC transfers to the highest priority for a variable number of packet transfers before returning to the priority dictated by the MRT algorithm previously described. The number of packets can vary between 0 and all available opportunities.

Referring again to FIG. 6, a chart of the concentrator interface port transfers over time and the resulting main memory store port transfers is shown for an arbitrary sample transfer. Each numbered bar represents the time required to transfer a single 33-word packet (32 data words plus a command word) across the concentrator interface read bus 224 and into the concentrator interface buffer 220. Sequential packets in a single channel are lettered a, b, c, etc. and the channels are distinguished by their concentrator interface means numbers. The smaller bars represent the time required to transfer a single 33-word packet over the memory store ports 210 and 250. It should be noted that the time required to move a packet across the memory store port is ⅛th that of the time required to move the same packet across the concentrator interface store bus 226. As each packet is received, the concentrator interface logic 222 in the CIP 130 requests access to the appropriate memory store port. When access is granted by the arbitration network 114, the concentrator interface logic 222 transmits the packet to the selected store port at the higher port transfer rate.

The example illustrated in FIG. 6 assumes that the initial priority of the CIP 130 for access to the memory store port is #1 (highest) descending in numerical order to #8, which is lowest. This priority is used to resolve access as a result of simultaneous requests. An example of two simultaneous requests is shown between concentrator interface ports #2 and #3. Both obtain complete packets from their respective concentrator interface store busses 226 at the same time and request access to the memory store port at the same time. Because port #2 is higher priority than port #3, port #2 is granted access. The concentrator interface logic 222 for Port #3 maintains its request and retains the packet in its buffer 220 until port #2 has completed sending its packet to the memory port. When port #2 has completed sending its packet, the IOC 24 grants port #3 access, even though port #4 has just received a complete packet and is also requesting access. This process continues as each CIP 130 receives a complete packet. It should be noted that any one CIP 130 has no more than two packets in its buffer at any time. The IOC 24 is always able to grant access to the memory store port 210 or 250 and empty a concentrator interface buffer 220 before it needs to accept a subsequent packet from the concentrator interface store port 226.

The same multiplexing technique is used to issue packets for the secondary memory port 106. The reverse process is used to fetch packets from the SMS 28. Each CIP 130 requests access to the secondary memory port 106 to issue a fetch command word. One request is permitted by the arbitration network 114 every 34 cycles. Packets are returned in the order requested and are delivered to the buffer 220 of the CIP 130 that made the request. Because data returns from the port eight times faster than the CIPs 130 can transmit it over the concentrator interface fetch bus 224, interleaving single packet requests allows secondary memory to supply data fast enough to keep all eight CIPs 130 busy all the time.

Out-of-Order Access.

In the preferred embodiment, data fetched from main memory 14 or global registers 16 can return in an order that is different than the order in which it was requested. The preferred out-of-order access is described in greater detail in the previously identified co-pending patent application entitled METHOD AND APPARATUS FOR NON-SEQUENTIAL RESOURCE ACCESS.

For fetches from main memory 14, individual data words are returned to the concentrator interface buffers 220 in an unpredictable order. Individual data words returning via the cluster port 108 are randomly intermixed among requesting CIPs 130 and the SMTC buffers 230 and 240. Packets are completed at the concentrator interface buffers 220 at random intervals as a result, but on average, packets will be returned at a rate fast enough to keep the concentrator interface busses 224 and 226 constantly busy. Although the fetches from main memory 14 may be returned to the buffers 220, 230 and 240 in an unpredictable order, data is always removed from the buffers 220, 230 and 240 in proper sequential order.

Both the CIPs 130 and the SMTCs 104 compensate for this behavior by appending request tags to memory requests. Request tags are sent with the command word that precedes the data packet when it travels through the IOC. 24 The request tags contain a four-bit field indicating which buffer in the IOC will receive the data, and a 6-bit field indicating the location in that buffer where the data will be stored. The request tags and the four-bit buffer select field that is decoded are illustrated in FIG. 11. The buffer select code 1011 directs data to one of the two SMTC command buffers. The other 6 tag bits indicate which buffer and in what location the returning data word is to be stored. The code 1111 is not used by the IOC 24. It is reserved for the CPU Instruction cache fetch operations. In the preferred embodiment, the external interface ports 22 shares a memory port with an instruction cache (not shown) in the processor 10.

The 6-bit field is generated at the external interface ports 22 for each individual data word request when it is made. Requests are made in order starting with the lowest address. The request tags, the 6-bit word identifier and the four bit destination identifier, travel with the request through the memory system and are returned with each word of data as it is sent to the IOC 24. The request tags are then used at the main memory fetch interface 212 to direct the data word to the appropriate buffer and location in the buffer 220 or 240. Because tags are created in sequential order when requests are made, using the request tags to address locations in the destination buffers 220 or 240 ensures that data is always loaded into the buffers 220 or 240 in proper sequence, even if the data returns in an arbitrary order. Reading data from the buffer in sequential order therefore guarantees that data is returned to the destination in proper order.

Data is sent to any concentrator interface port fetch bus 226 in the order it was requested. If any data word is received at the concentrator interface buffer 220 before any words that should precede it over the fetch bus 226, then that word is held until all prior words have been received and then sent over the bus 226. Data is sent as soon as it can be sent over the fetch bus 226. The result is that data will always be returned to the CIP 130 in order, but not necessarily in a contiguous stream.

Data is always sent to SMS 28 in 32-word packets. All words associated with any block must be present in the SM to MM buffer 230 before any words are sent. Since the request tags ensure that data is loaded in order in the buffer, reading the words out in buffer order presents them in the correct order to the SMS 28.

Signal Transmission

Referring again to FIG. 4, the manner in which signals are transmitted from the IOC 24 to the signal logic 98 in the interrupt mechanism 18 will be described. Signals are transmitted in the form of a command word and a data word delivered over the CCI 120. The command word indicates that a signal operation is to be performed. The data word contains a selection code that is used to determine the destination of the signal. The external interface port 22 sends the signal command and selection code to the signal logic 98 through the arbitration node 44. Receipt of the signal command at the signal logic 98 causes a signal code to be returned to the arbitration node 44 that is connected to the selected destination for the signal. The signal code is decoded in the arbitration node 44 to determine the proper one of the two processors 10 or external interface ports 22 to which the signal should be sent.

Figures 12, 15, 17:
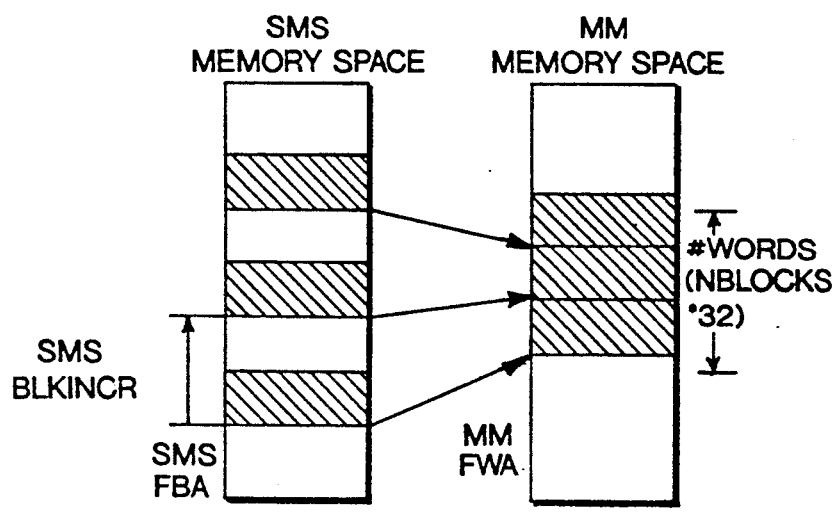
FIG. 12 shows the signal code decode.
FIG. 15 shows the SMTC command block.
FIG. 17 shows how block addresses are calculated in secondary and main memory by the SMTC.

If the signal is directed to an IOC 24, a 7-bit code (as shown in FIG. 12) is sent to the CCI 120 through the external interface port 22. This 7-bit code is decoded by the concentrator signal logic 110 in the IOC 24. The Valid bit indicates that a signal is present on the CCI 120. The Class bit selects either the SMTC 104 or the channel adapters 102 as the destination (1=STMC). The Channel Select bits determines which of the 8 channel adapters 102 will be signaled if the Class bit is zero. If the Class bit is 1, the 1sb of the Channel Select bits determines whether SMTC0 (104a) or SMTC1 (104b) is being signaled (0=SMTCO). Dedicated signal in the CIP 130 transmit the type bits directly to the channel adapter 102 selected in the Channel Select bits.

For a more detailed description of the operation of signals in the preferred embodiment, reference is made to the previously identified co-pending application entitled SIGNALING MECHANISM FOR A MULTI-PROCESSOR SYSTEM.

External Interface Port

Figure 13A:
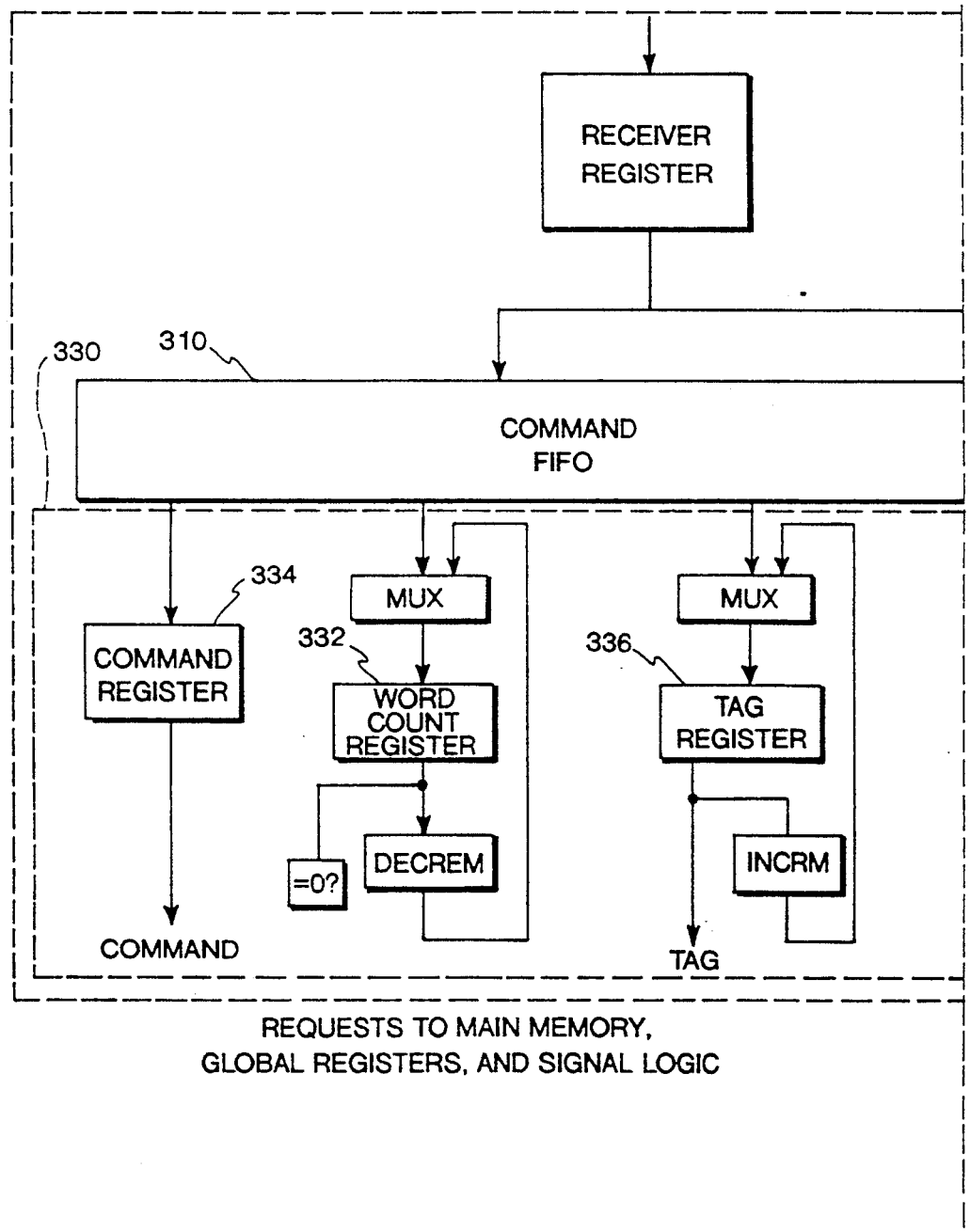
FIG. 13 is a block diagram of the external interface ports.

Referring now to FIG. 13, a detailed description of the external interface ports 22 of the preferred embodiment is provided. The external interface ports 22 accepts packets of command and data words from the main memory store multiplexer 210 via a memory port cable (not shown) that physically connects the CCI 120. Command words are placed in the command buffer 310 and data is routed into the data FIFO 320. The presence of a command in the command buffer 310 causes control logic 330 in the external interface ports 22 to request access to memory through the arbitration node 44. Data from the word count, command, address, and mtag fields of the command word are loaded into the respective registers 332, 334, 336 and 338 in preparation for delivery to the arbitration node 44 when the request is acknowledged. A new request tag and address must be computed for every word request made.

For fetch requests, no data is sent but an address and request tag are sent for a number of requests equal to the contents of the command word count field. The request tags are computed starting with the lower six bits set to zero and incrementing the contents of that field until the proper number of tags have been sent. Similarly, addresses for requests are computed starting with the address presented in the command word and incrementing it as each request is acknowledged.

For store requests, the next word in the data FIFO 320 is presented along with the address, tag, and command information. The word count value is decremented after each request. No further requests are made when the word count value reaches zero. FIFOs 310 and 320 are used to hold commands and data to ensure that, wherever possible, a command and data are always available at the external interface ports 22 to keep the arbitration node 44 constantly busy.

Fetched data returns from the shared resources through the transmit register 340. The request tag issued when the request was made is returned with the data. The output of the transmit register 340 is connected to the main memory fetch interface 212. Control lines associated with the data lines in the cable linking the external interface ports 22 are inserted to indicate that a valid data word is on the bus for the CCI 120.

Secondary Memory Transfer Controller

Figure 14:
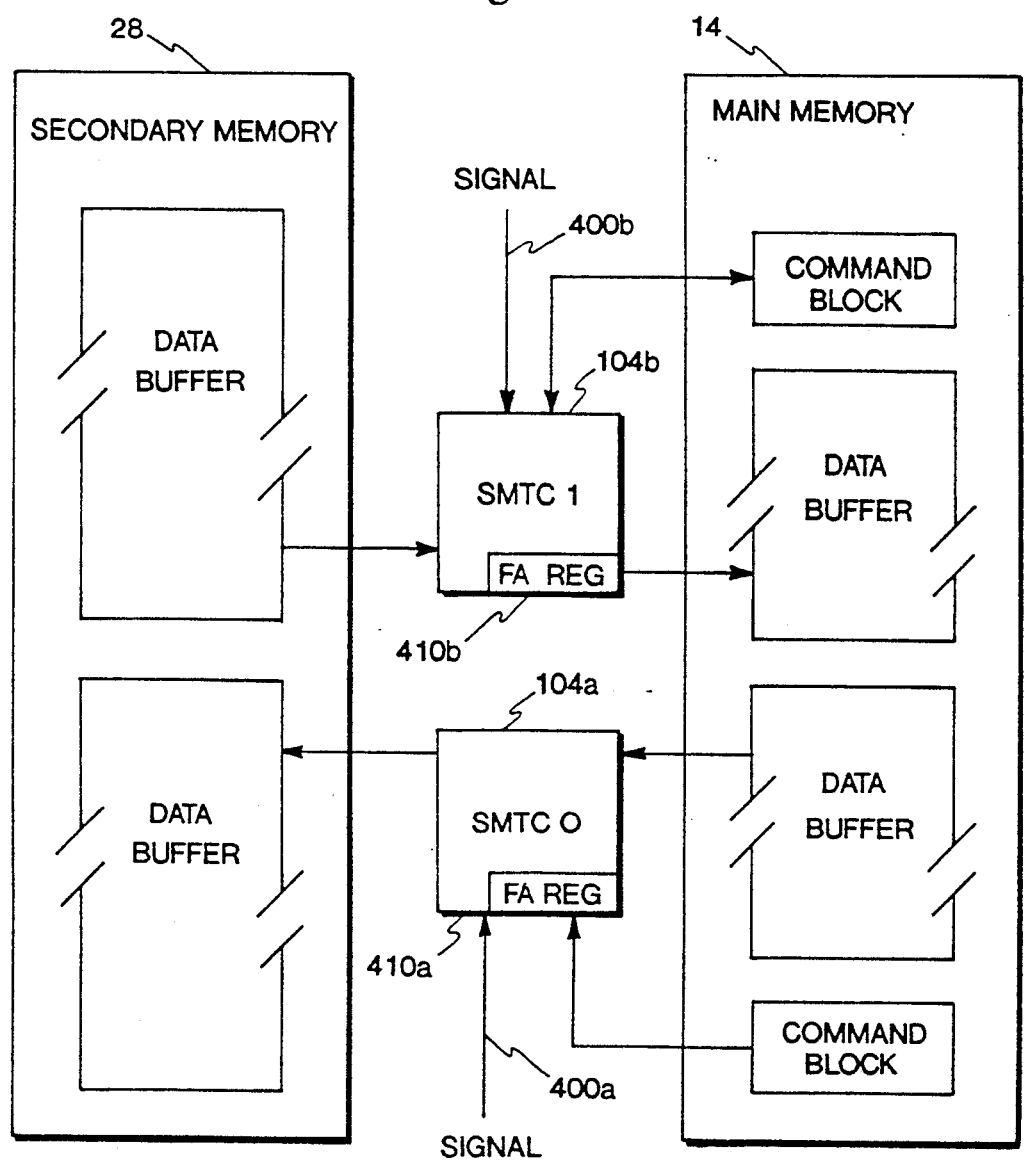
FIG. 14 is a conceptual model of the Secondary Memory Transfer Controller operation.

Referring now to FIG. 14, the Secondary Memory Transfer Controller (SMTC) 104 of the preferred embodiment is described. In the preferred embodiment, the SMTC 104 controls transfers to the SMS 28. The only addressable unit in the SMS 28 is a block of 32, 64-bit words. Transfers are constrained to begin on a block boundary. Requests for secondary memory transfers (reads or writes) may be initiated by either the channel adapters 102 or the SMTC 104. Transfers to the channel adapters 102 and to the cluster port 108 may proceed simultaneously. Error detection and correction is done at the SMTC 104. In the preferred embodiment, the SMTC 104 consists of two independent controllers 104a and 104b, one for moving data from main memory 14 to the SMS 28 and the other for moving data from the SMS 28 to main memory 14. The controllers accept commands in the form of command blocks that are constructed in main memory 14. The command blocks provide the starting address in main memory 14, the starting address in secondary memory 28, the increment on the base address in secondary memory 28, the number of 32-word blocks to be moved, and the direction of the transfer. Transfer size can range between 1 and (memory size/32) blocks.

Blocks may start and end on any full-word address in main memory 14. Only full-word transfers aligned on full-word boundaries are possible. The only addressing algorithm supported in main memory 14 is unity increment. Secondary memory addresses are restricted to always begin on even 32-word block boundaries. Transfer size is always an integer multiple of the 32-word block size.

As illustrated in FIG. 14, command execution is initiated by sending a signal 400 to the SMTC 140a or 140b. For a more detailed description of the operation of signals in the preferred embodiment, reference is made to the previously identified co-pending application entitled SIGNALING MECHANISM FOR A MULTIPROCESSOR SYSTEM. The preferred embodiment has up to 32 pairs of SMTCs 104a and 104b in a fully-configured cluster 40. The particular SMTCs 104 within a cluster 40 are selected by the Signal "substrate select" field in the SMTC Command word that is part of the SMTC Command Block as shown in FIG. 15. Separate signals 400a and 400b initiate transfers in each direction. The SMTC0 at channel select address O controls transfers in the direction from main memory 14 to secondary memory 8. The SMTC1 at channel select address 1 controls transfers in the direction from secondary memory 28 to main memory 14. SMTC selection is based on the LSB of the channel select field so that odd-numbers select SMTC1 and even numbers select SMTC0.

The SMTC 104 recognizes four signal types. The response of the SMTC 104a and 104b to receiving each of the four signal types is described for the preferred embodiment in Table II.

Table II

Type 00-Fetch command block and start the specified transfer

Type 01-Stop the transfer in progress. Transfer status is reported when the SMTC actually halts the transfer. A completion interrupt will be generated if requested in the command packet that started the transfer. If no transfer is in process when a Stop signal is received, no action is taken by the SMTC.

Type 10-Reserved

Type 11-Reserved

At the conclusion of a transfer, a status word is written back to the command block in main memory 14 and an optional completion interrupt can be generated. Interrupt generation is specified by the contents of the command block that originated the transfer. The target of the completion interrupt is also determined by the command block.

Transfer are permitted between the SMS system 28 that is attached to one cluster 40 and main memory 14 located in another cluster 40. It will be noted that the total system communication bandwidth between clusters 40 is significantly less than the bandwidth to memory within a cluster 40. Transfers between clusters 40 may take longer and may increase the execution time of other processes that access data in another cluster 40.

Two fetch address (FA) registers 410a and 410b, one in each SMTC, specify the locations in main memory 14 from which the controllers 104a and 104b fetch their respective command blocks. In the preferred embodiment, the FA registers is 410a and 410b are loaded via a scan path by a common maintenance control unit (not shown) during system boot time. The FA registers 410a and 410b are not accessible during normal operation.

All data words contain error-detection and error-correction bits in both main memory 14 and secondary memory 28. Each word is checked as it is read from or written into secondary memory 28. Any single-bit errors are corrected and are reported to a maintenance console that is part of the maintenance control unit. Detection of double-bit errors causes the transfer to terminate. Double-bit errors are reported in the status word that is written into the command block at the termination of the transfer.

The SMTC Command block format is shown as it appears in main memory 14. The following are definitions of the command block words and are defined in Table III.

TABLE III

| | |
|---|---|
| bit 0-3 | command field |
| bit 4 | interrupt on operation complete |
| bit 5-8 | transfer priority |
| bit 9-63 | unused |

SMTC command field contains bits to indicate that either a transfer operation or a reset operation is to be done. It also determines whether an interrupt is generated on completion. The command field for SMTC0 is defined in FIG. 16a and the command field for SMTC1 is defined in FIG. 16b. The "interrupt on operation complete" field (command word bit 4) directs the SMTC 104 to issue a Signal 400 at the conclusion of the requested operation. A Signal 400 is sent if this bit is set to one in the command block. No Signal is sent if this bit is zero. The device that will receive the Signal 400, if requested, is determined by the contents of word six of the command block (Signal Device Selection).

SMS FBA is the first address in SMS 28 to begin transferring data to or from. Only bits 31-0 are used during the transfer. Bits 63-32 are not used by the SMTC 104 and are ignored. The 32-bit value is interpreted as a block address in secondary memory 28. A value of 00000000 will point to the first word of the first block in secondary memory 28. A value of 00000001 will point to the first word in the second block in secondary memory 28.

SMS NBLOCKS is the number of 32-word blocks to transfer. Only bits 31-0 are used during the transfer. Bits 63-32 are not used by the SMTC and are ignored. A "one" in this field will transfer one 32-word block. It will be noted that a zero in this field will transfer $2^{32}$ blocks (approximately one Terabyte).

SMS BLKINCR is the block address increment between adjacent data blocks moved by the SMTC 104. Only bits 31-0 are used during the transfer. Bits 63-32 are not used by the SMTC and are ignored. This concept is shown in FIG. 17. An increment of "one" will transfer a contiguous block of secondary memory 28. It will be noted that if zero is placed in SMS BLKINCR, then the same block will be transferred for NBLOCKs. If (SMS FBA+(NBLOCK * SMS BLKINCR*32)) is greater than the memory available in SMS 28, the transfer will wrap-around into available memory.

MM FWA is the first word in main memory 14 to begin transferring to or from. Only bits 33-0 are used during the transfer, bits 63-34 are not used by the SMTC 104 and are ignored. The 34-bit value is interpreted as a word address in main memory 14. If (MM FWA+(NBLOCK *32)) is greater than the memory available in main memory 14, the transfer will wrap-around into available memory.

TRANSFER STATUS. This area of the SMTC command area is used for reporting of transfer completion information and error reporting. Bits are assigned as shown in Table IV.

Table IV

Bit 0 operation complete
Bit 1 double-bit error in data transfer
Bit 2 invalid command
Bit 3 parity error
Bit 4 command fetch error
Bit 5 sequence error (another start has been received while a previous transfer is still in progress)

Detection of a double-bit or parity error during the command block fetch causes the SMTC to report the error in the command block status word, but no transfer is started. Errors detected during a data transfer halt the transfer in progress.

SIGNAL DEVICE SELECTION contains an address of a device to be signalled upon completion of the operation. If a completion signal is specified in the SMTC command field (bit 4), the SMTC 104 uses this value to select the device to be signalled and the type of signal to be issued.

The priority select field of the command word is defined in FIG. 19. If no channels are active, the SMTC will receive 100% of the possible memory cycles. If any channels are active, then the SMTC will receive at least the percentage of memory cycles specified in the table. Any memory cycles unused by the channels will also be allocated to the SMTC transfer.

Operation of the Secondary Memory Transfer Controllers

Referring again to FIG. 9, the operation of the SMTC 104 will be described. Operation of the SMTC 104 is based on fetching a command block from main memory 14 and using the fetched information to govern a transfer between main memory 14 and secondary memory 28. At the conclusion of the transfer, a status word is stored back into the command block in main memory 14, and an optional Signal can be sent. This sequence is the same for SMTC0 and SMTC1, as is their internal organization.

SMTC 104 consists of eight registers, three arithmetic operation units, and control logic that governs loading the registers and use of their contents during transfers. In the preferred embodiment, an input register mux 502 and output register mux 504 multiplexes the appropriate registers. The operating sequence is initiated by sending a Signal to the SMTC. (A type 00 Signal specifies that the SMTC fetch a command block and start the specified transfer.) The signal is received at the IOC Memory Fetch interface 212, decoded by the concentrator signal logic 110, and sent to the SMTC 104 specified by the signal. On receiving the signal, the SMTC 104 requests access to the main memory store mux 210 to present a memory fetch command to read the command block. Command logic 510 in the SMTC 104 forms the fetch command from a combination of hard-wired logic (a command code that specifies a fetch from main memory 14, a tag code that specifies the SMTC 104 as the destination for the fetched data, and a word count equal to seven) and an address from command address register 512 that contains the location of the command block. The command address register 512 is loaded by a maintenance control unit (MCU) (not shown) through a scan path means 514 when the multiprocessor system is initialized.

When the IOC arbitration control 114 acknowledges the request, the SMTC 104 presents the command (to fetch the command block) to the main memory 14 fetch port. After some delay, the data is returned in random order to the SMTC 104. The SMTC 104 uses the request tag that accompanies the returned data to decide which control register to load the data into. FIG. 19 shows the correspondence between the returned request tag and the command block word. Command block word 1 is discarded when returned. That position in the command word is a place holder for the status word to be written at the conclusion of the transfer. Word 2 is loaded into the command register 515. Word 3 is loaded into the SM block address register 516. Word 4 is loaded into the block count register 517. Word 5 is loaded into the SMS increment register 518. Word 6 is loaded into the MM address register 519. Word 7 is loaded in to the signal register 521. When all of the command block information has been loaded into the SMTC control registers, the SMTC requests access to the appropriate Store port to make the first block fetch request. Because operation of SMTC0 is slightly different from SMTC1, they will be described separately from this point.

To begin a transfer, SMTC0 composes a command word composed of a hard-wired fetch request (fetch command, word count=32, tag=MM to SM buffer), and an address in main memory 14 from the contents of the MM address register 519. When access is granted, SMTC0 presents the command word to the main memory store mux 210. It then decrements the contents of the block count register 517 and checks to see if block count register 517 is zero. If the result is zero, no further Fetch requests are made. If the result is not zero, the block count register 517 is loaded with the decremented value. The contents of the MM address register 519 are incremented by 32 and the result is placed back in the register in preparation for the next fetch request. The SMTC 104 then requests access to the main memory store mux 210 to start another block fetch. This process repeats until the block count register 517 goes to zero.

When data begins to return to the IOC 24 as a result of the SMTC0 fetch requests, the tag bits direct the IOC 24 to load the data into the MM to SM buffers 240. When all 32 words in the fetched block are present in the MM to SM buffer 240, the SMTC 104 requests access to the SM store mux 250. At the same time, the SMTC 104 composes the SM command word that will precede the data as it is sent. The command word is composed of a store command from the SM command register 515, and an address in secondary memory from the contents of the SM address register 516. When access is granted, the SMTC 104 delivers the command word to the SM store mux 250, and directs the MM to SM buffer 240 to deliver the block of data immediately after the command word. The SMTC 104 then adds the contents of the SM using the adder 523 to increment register 518 to the contents of the SM block address register 516 and places the result in the SM block address register 516, thereby forming the address of the next block to be stored in SM 28.

The MM to SM buffer 240 can hold up to six, 32-word blocks at a time. Logic in the SMTC makes fetch requests to MM 14 as long as there is space in the MM to SM buffer 240 to hold the block as it returns from MM 14. Other logic in the SMTC 104 makes store requests to SM 28 as long as there are complete blocks of data in the MM to SM buffer 240. The transfer is complete when the block count register 517 contains zero and all of the requested data has left the MM to SM buffer 240 and has been delivered to SM 28.

Operation of SMTC1 will now be described. To begin a transfer, SMTC1 composes a command word consisting of a SM fetch command (from the SM command register 514), and an address in secondary memory 28 from the contents of the SM address register 516. When access is granted, SMTC1 presents the command word to the SM store mux 250. It then decrements the contents of the block count register 517 and checks to see if block count register 517 is zero. If the result is zero at comparator 522, no further Fetch requests are made. If the result is not zero, the block count register 517 is loaded with the decremented value. SMTC1 then adds the contents of the SM increment register 518 to the contents of the SM address register 518 and places the result in the SM address register 516, thereby forming the address of the next block to be fetched from SM. This process repeats until the block count register 517 goes to zero.

When data begins to return to the IOC 24 as a result of the SM fetch requests, the data is loaded into the SM to MM buffers 230. Since data always returns from SMS 28 in the order in which it was requested, no tag bits are required, and data is loaded into the buffer 230 in the order in which it arrives. When all 32 words in the fetched block are present in the SM to MM buffer 230, SMTC1 requests access to the MM store mux 210. At the same time, SMTC1 composes the MM command word that will precede the data as it is sent. The command word is composed of a hard-wired store request (MM store command, word count=32), and an address in main memory 14 from the contents of the MM address register 519. When access is granted, SMTC1 delivers the command word to the MM store mux 210, and directs the SM to MM buffer 230 to deliver the block of data immediately after the command word. The contents of the MM address register 519 are incremented by 32 using the adder 524 and the result is placed back in the register 519 in preparation for the next store request.

The SM to MM buffer 230 can hold up to six, 32-word blocks at a time. Logic in SMTC1 makes fetch requests from SMS 28 as long as there is space in the SM to MM buffer 230 to hold the block as it returns from SM 28. Other logic in the SMTC 104 makes store requests to MM 14 as long as there are complete blocks of data in the SM to MM buffer 230. The transfer is complete when the block count register 517 contains zero and all of the requested data has left the SM to MM buffer 230 and been delivered to MM 14.

Both SMTC0 and SMTC1 conclude a transfer in the same manner. After the last data block is stored in the destination memory, the SMTC 104 requests access to the main memory 14 store mux so that it can write the transfer status word into the command block in main memory 14. When access is granted, the SMTC 104 sends a command word consisting of a hard-wired memory store command (command=main memory 14 store, word count=1) and an address from the contents of the MM address register 519 to the MM store mux 210, followed immediately by a status word from the transfer status register 525. Bits are set in the transfer status register 525 indicating various conditions during the transfer. These indicators are returned to the command block at the end of the transfer so that the process that initiated the transfer can determine whether the transfer completed successfully.

After the status word is written, the SMTC 104 may optionally send a Signal to announce transfer completion. A bit in the SMTC command register indicates whether this step will be taken. If the signal is to be sent, the SMTC 104 requests access to the MM store mux 210. When access is granted, the SMTC 104 sends a command word consisting of a hard-wired command field (Signal command, word count=1) and an address of the device to be signaled from the contents of the signal register 521, followed by a single data word that also contains the address from the contents of the signal register 521. At this point the transfer is complete and the SMTC 104 returns to an idle state, waiting for another signal that will start another transfer.

Operation of the Concentrator Interface Ports

Referring again to FIG. 9, the manner in which the channel adapters 102 communicate with the IOC 24 will be described. The channel adapters 102 communicate through a bus and control means called a concentrator interface port (CIP) 130. Each CIP 130 provides two uni-directional data busses, one for stores (224) into shared resources of the preferred embodiment, the other for fetches (226). Exchange of data and control information is governed by a hardware protocol using a number of control lines that are part of the concentrator interface logic 222. Each bus has 64 data lines and 8 parity lines, one for each byte of data.

The IOC 24 stores incoming packets in buffers located in each concentrator interface means. Each CIP 130 has a two-word command buffer 228 and a 64-word data buffer 220. The command buffer 228 holds the command word from the last one or two packets sent over the Store bus 224, but only one command is active at a time. The information in the active command word is used to direct the concentrator interface logic 222 in completing the requested operation. Under certain conditions, the time it takes to fetch data may be a significant fraction of the time required to transmit a packet of returned data over the fetch bus 226. If the CIP 130 accepted only a single packet and waited for the last data word to be returned before accepting a subsequent packet, the overall transfer rate of the CIP 130 would be considerably reduced. To ameliorate this condition, the CIP 130 will accept a second fetch command packet before any or all of the data has been returned from the first command packet. Data from any prior fetch command is always returned before data from a later command is delivered.

For Store operations, the data buffer 220 is used to temporarily hold data until the entire packet has been received from the channel adapter 102. For Fetch operations, the data buffer 220 is used to re-order data received from the shared resources. The multiplexers 221 at the input to the data buffer 220 are used to direct data flow according to the direction and source. When the CIP 130 is performing a Store operation, the multiplexer 221 selects the store bus 224. When performing a Fetch operation, the multiplexer 221 selects either the main memory fetch interface 212 or the secondary memory fetch interface 252, depending on the operation specified in the currently active command word. Because Fetch and Store operations require different multiplexer selections, they are not permitted to occur simultaneously. The control interface logic 222 prohibits a Fetch operation from starting while a Store operation is in progress, and vice-versa. Semaphore operations (command that initiate both a store and fetch operation, e.g. the loadf instruction previously described) are also prohibited while either a Fetch or Store operation is outstanding.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A cluster channel interface mechanism for a distributed input/output system of a highly parallel multiprocessor system having a plurality of processors tightly coupled to a set of common shared hardware resources, the distributed input/output system having a plurality of external interface ports which are directly connected to the set of common shared hardware resources, the shared hardware resources including a main memory, a plurality of global registers and an interrupt mechanism, the shared hardware resources having a plurality of operating system shared resources which are stored in the main memory and the global registers and which contain selected information for controlling the operation of the multiprocessor system, the cluster channel interface mechanism comprising:

cluster port means operably connected to one of the external interface ports for sending and receiving data and control information between the cluster channel interface mechanism and the set of hardware shared resources;

secondary port means operably connected to a secondary memory system for sending and receiving data information between the cluster channel interface mechanism and the secondary memory system;

secondary memory transfer controller means operably connected to the secondary port means and the cluster port means for sending and receiving control information related to the secondary memory system and for controlling the transfer of data information between the secondary memory system and the main memory;

a plurality of concentrator interface port means, each concentrator interface port means operably connected to a unique channel adapter that is connected to a peripheral controller by a standard channel interface, each concentrator interface port means for sending and receiving control and data information between the cluster channel interface mechanism and the perhipheral controller by the unique channel adapter and the standard channel interface; and switch means operably connected to the cluster port means, the secondary port means and each of the plurality of concentrator interface port means for selectively connecting the cluster port means with the secondary port means or the cluster port means with a selected one of the concentrator interface port means in response to a request to send or receive control and data information between the set of hardware shared resources and the secondary memory system or between the set of hardware shared resources and a selected one of the peripheral controllers, respectively.

2. The cluster channel interface mechanism of claim 1 further comprising:

a plurality of first interface buffer means, one for each of the concentrator interface port means, for receiving and storing data information from the concentrator interface means at a low speed data transfer rate;

a plurality of second interface buffer means, one for each of the concentrator interface ports, for receiving and storing data from the cluster port means at a high speed data transfer rate;

concentrator interface logic means operably connected to the first and second interface buffer means for multiplexing and demultiplexing data stored in the first and second interface buffer means, such that data information to be transferred to the plurality of concentrator interface port means at the low speed data transfer rate is time multiplexed onto the cluster port means at the high speed data transfer rate and vice versa.

3. The cluster channel interface mechanism of claim 1 wherein the secondary memory transfer controller means comprises:

first controller means for controlling the transfer of data information from the main memory to the secondary memory; and second controller means for controlling the transfer of data information from the secondary memory to the main memory.

4. The cluster channel interface mechanism of claim 1 wherein the switch means further comprises means for selectively connecting the secondary port means with a selected one of the concentrator interface port means in response to a request to send or receive control and data information between the secondary memory system and a selected one of the peripheral controllers.

5. The cluster channel interface mechanism of claim 1 further comprising:
arbitration means operably connected to the switch means for arbitrating among a plurality of simultaneous requests to determine the order in which the requests will be serviced.

6. The cluster channel interface mechanism of claim 5 wherein the arbitration means is comprised of a multiple request toggling system that arbitrates among requests on a first-come, first-served basis with the priority of multiple simultaneous requests being resolved on the basis of a toggling decision between any unique pair of requests.

7. The cluster channel interface mechanism of claim 1 further comprising:
concentrator signal logic means operably connected to the cluster port means, the secondary memory transfer controller means and each of the cluster interface port means for sending and receiving signals to and from interrupt mechanism in the multiprocessor system, the secondary memory transfer controller means and each of the cluster interface port means.

8. The cluster channel interface mechanism of claim 1 wherein the data and control information are transferred as a data packet and a command packet,
the data packet comprising a fetch command word, a store command word and thirty-two data words;
the command packet comprising a single word having a word count field, a command field, a tag field and an address field.

9. The cluster channel interface mechanism of claim 8 wherein the tage field of the command packet is used by secondary memory transfer controller means and the peripheral controller means to allow data information to be received from the main memory in a non-sequential order.

* * * * *